(12) United States Patent
Mahbub

(10) Patent No.: US 6,961,443 B2
(45) Date of Patent: Nov. 1, 2005

(54) OCCUPANT SENSOR

(75) Inventor: Naveed Mahbub, Farmington Hills, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 686 days.

(21) Appl. No.: 09/882,959

(22) Filed: Jun. 15, 2001

(65) Prior Publication Data

US 2002/0050924 A1 May 2, 2002

Related U.S. Application Data

(60) Provisional application No. 60/211,846, filed on Jun. 15, 2000.

(51) Int. Cl.⁷ ............................................... G06K 9/00
(52) U.S. Cl. ..................... 382/100; 382/103; 382/104; 382/154; 701/45; 280/735; 348/148; 348/169; 340/436; 340/438; 340/439
(58) Field of Search ............................... 382/100, 103, 382/104, 154, 106; 701/45; 280/735; 250/559.19, 559.35, 559.38; 348/143, 148, 159, 169, 172; 340/436, 438, 439

(56) References Cited

U.S. PATENT DOCUMENTS

| | | | |
|---|---|---|---|
| 4,625,329 A | 11/1986 | Ishikawa et al. ............ 382/104 |
| 4,933,541 A | 6/1990 | Dufour ........................ 250/202 |
| 4,954,962 A | 9/1990 | Evans, Jr. et al. ............. 701/28 |
| 5,016,173 A | 5/1991 | Kenet et al. ................. 382/128 |
| 5,040,116 A | 8/1991 | Evans, Jr. et al. ............ 701/28 |
| 5,381,236 A | 1/1995 | Morgan ...................... 356/376 |
| 5,398,185 A | 3/1995 | Omura ................... 364/424.05 |
| 5,528,698 A | 6/1996 | Kamei ......................... 382/100 |
| 5,531,472 A | 7/1996 | Semchena et al. .......... 280/735 |
| 5,684,898 A | 11/1997 | Brady et al. ................ 382/282 |
| 5,785,347 A | 7/1998 | Adolph et al. .............. 280/735 |
| 5,835,613 A * | 11/1998 | Breed et al. ................ 382/100 |
| 5,852,672 A | 12/1998 | Lu ............................. 382/154 |
| 5,871,232 A | 2/1999 | White ......................... 280/735 |
| 5,877,801 A * | 3/1999 | Martin et al. .................. 348/36 |
| 5,983,147 A | 11/1999 | Krumm ....................... 701/45 |
| 5,988,862 A | 11/1999 | Kacyra et al. .............. 364/578 |
| 6,005,958 A | 12/1999 | Farmer et al. .............. 382/103 |
| 6,027,138 A | 2/2000 | Tanaka et al. .............. 280/735 |
| 6,099,030 A | 8/2000 | Kraft .......................... 280/735 |
| 6,113,137 A | 9/2000 | Mizutani et al. ............ 280/735 |
| 6,167,155 A | 12/2000 | Kostrzewski et al. ....... 382/232 |

FOREIGN PATENT DOCUMENTS

CA 2244061 3/1999 ............ B60N/2/44

* cited by examiner

Primary Examiner—Bhavesh M. Mehta
Assistant Examiner—John Strege
(74) Attorney, Agent, or Firm—Raggio & Dinnin, P.C.

(57) ABSTRACT

An occupant sensor incorporates a 3-D imaging system that acquires a 3-D image of an object. The image is segmented to remove unwanted portions and to identify a region-of-interest, and the content thereof is classified responsive to a plurality of 3-D features. In one embodiment, the 3-D image is transformed to a second 3-D image from a second viewing perspective. A two-dimensional projection of the second 3-D image is classified, and a presence, size and position of occupant can be identified from features thereof. A safety restraint system is controlled responsive to the detected scenario, including the presence, position and size of an occupant.

15 Claims, 15 Drawing Sheets

OCCUPANT SENSOR

CROSS-REFERENCE TO RELATED APPLICATIONS

The instant application claims the benefit of U.S. Provisional Application Ser. No. 60/211,846 filed on Jun. 15, 2000 (5701-00261), which is incorporated herein by reference.

DESCRIPTION OF EMBODIMENT(S)

Figures 1A, 1B:
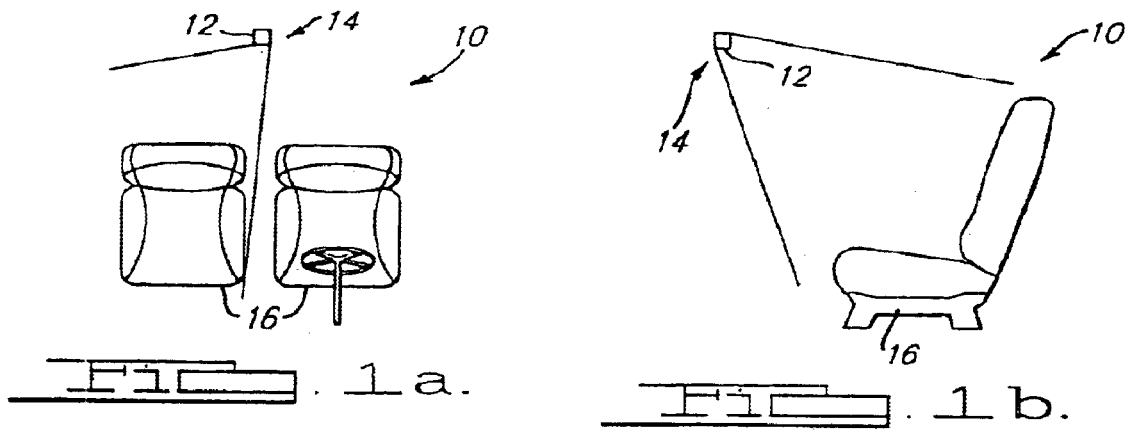
FIGS. 1a, 1b and 1c respectively illustrate front, side and top views of a three-dimensional (3-D) imaging system in a vehicle.
Figure 1C:
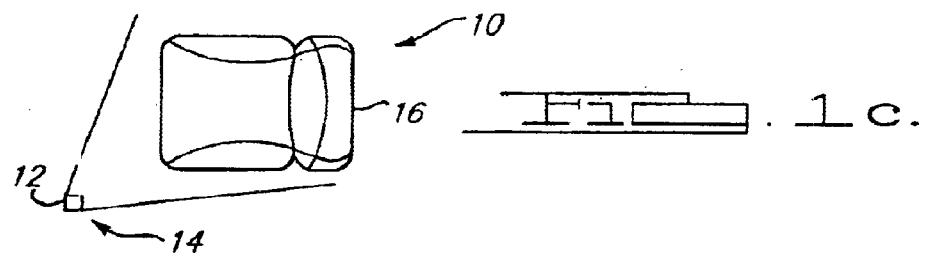

Referring to FIG. 1, occupant sensor 10 comprises at least one imaging device 12 in a three-dimensional (3-D) imaging system 14 that provides a 3-D image of a scene of a front passenger seat 16 of a vehicle. The 3-D image comprises a set of 'voxels', or three-dimensional pixels, each consisting of x, y an z coordinates with respect to a rectangular coordinate system.

The 3-D imaging system 14 can be located at a variety of locations in view of the seat 16, for example, at the headliner above the rear view mirror and pointing towards the passenger seat 16, so as to provide the maximum field of view with minimal obstruction. This location reduces the exposure of the 3-D imaging system 14 to direct sunlight and has minimal affect on the appearance of the vehicle interior. However, some locations are less desirable than others. For example, if the 3-D imaging system 14 is placed too high on the passenger side A-pillar it can be obstructed by the sun visor when positioned sideways to block the sunlight coming in through the side window. A 3-D imaging system 14 placed low on the A pillar can be obstructed by the occupant's hand(s) or by the occupant reading a newspaper. A 3-D imaging system 14 placed on the dashboard would not 'see' the whole scene, and would be readily obstructed. The field of view of a 3-D imaging system 14 placed near the dome light could be obstructed by the head of an occupant. Moreover, such a location would not be desirable for vehicles with sunroofs.

Various 3-D imaging techniques are capable of providing range images, for example 1) stereo vision, 2) structured lighting and 3) scanning beam (e.g. scanning laser), any of which techniques could be embodied by the 3-D imaging system 14.

(1) Stereo Vision

Figure 2:
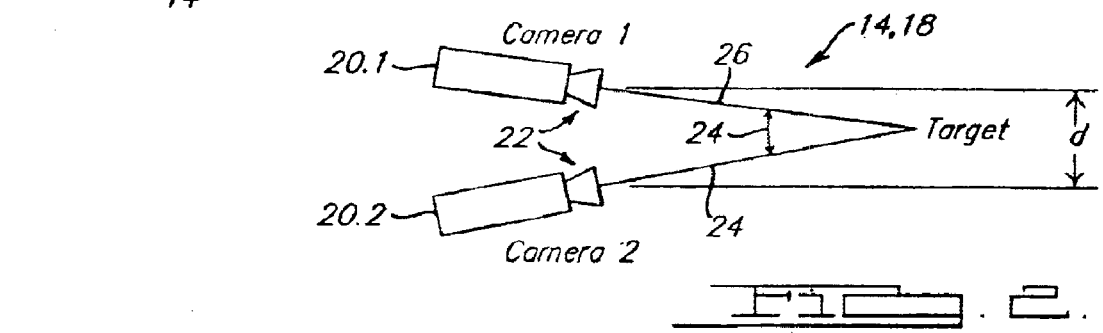
FIG. 2 illustrates an arrangement of cameras of a stereo vision system.

Referring to FIG. 2, a first embodiment of a 3-D imaging system 14 is illustrated by a stereo vision system 18 comprising a pair of substantially identical cameras 20.1, 20.2 (e.g. CCD, CMOS or other technologies) with substantially identical optics 22 spaced apart by a small base distance d. The angle 24 between the respective optic axes 26 of the cameras is exaggerated in FIG. 2. With the advent of relatively small and inexpensive cameras 20.1, 20.2, the stereo vision system 18 can be made relatively small. Moreover, these cameras 20.1, 20.2 can be adapted with a logarithmic response to provide a relatively high dynamic range, so as to prevent or limit saturation when targets are illuminated by sunlight hits the targets, while at the same time providing sufficient contrast under low ambient lighting conditions, for example at night time, perhaps with minimal supplemental infrared (IR) illumination provided by an infrared light emitting diodes (LED) or other illumination source. For example, low power LED's are relatively inexpensive and safe, and provide illumination that is invisible to the human eye—thereby not a distraction—and can be automatically turned on to improve the overall contrast and average intensity of the images, for example if the overall contrast and average intensity are otherwise low.

Figure 3:
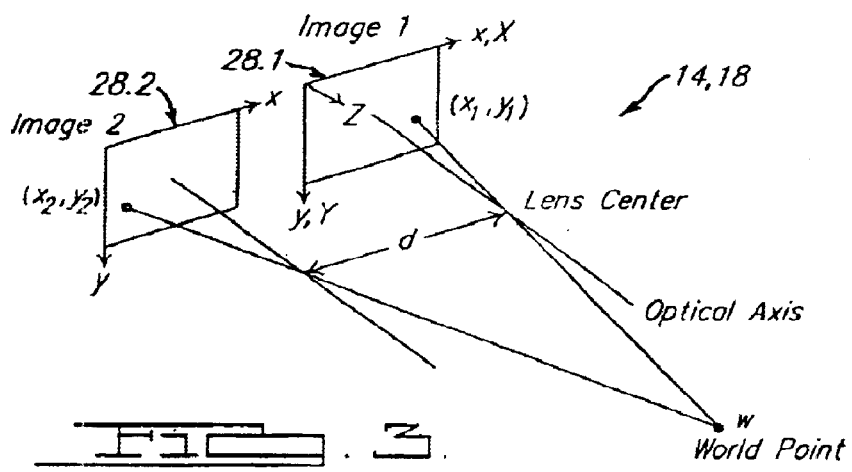
FIG. 3 illustrates a model of a stereo imaging process.

Each camera 20.1, 20.2 captures a respective image 28.1, 28.2 of the same scene. Referring to FIG. 3, similar objects in the two images are identified by registration thereof with one another, and the 2-D Cartesian coordinates $(x_1, y_1)$ and $(x_2, y_2)$ respectively corresponding to a common point of the object are determined from the pixel location with respect to the camera coordinate system (x, y). If the world coordinate system (X, Y, Z) coincides with that of camera 20.1, then the 3-D coordinates $(X_w, Y_w, Z_w)$ of the target point w are given by:

$$Z_w = \lambda - \frac{\lambda d}{x_2 - x_1} \quad (1)$$

$$X_w = \frac{x_1(\lambda - Z_w)}{\lambda} \quad (2)$$

$$Y_w = \frac{y_1(\lambda - Z_w)}{\lambda} \quad (3)$$

where, $\lambda$ is the focal length of the lenses of the cameras

Figure 4:
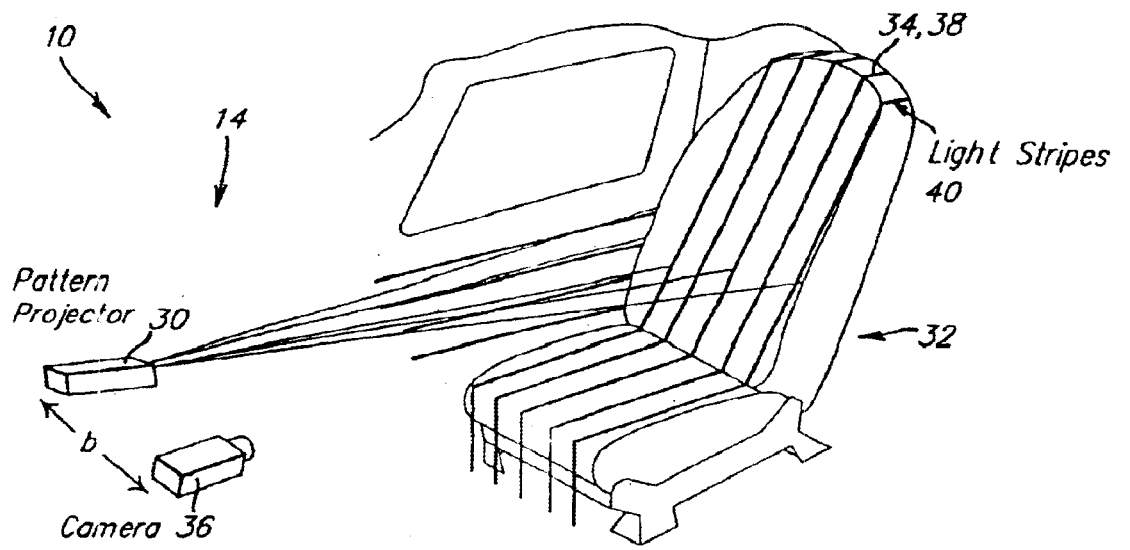
FIG. 4 illustrates a 3-D imaging system using structured lighting.
Figure 5:
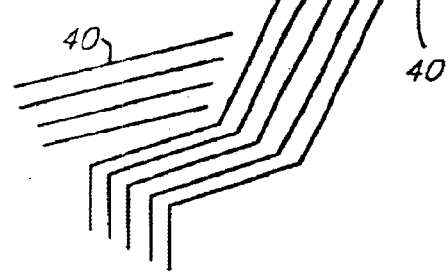
FIG. 5 illustrates an image of light stripes by a 3-D imaging system of FIG. 4.

This technique is dependent on the object being imaged having sufficient detail so as to enable the detection thereof from the correlation of the separate stereo images 28.1, 28.2. For the case of a large area of uniform intensity, for which there is substantially no detail, in order to prevent the matching process from otherwise failing, a pattern of infrared spots can be projected on the scene (similar to the structured lighting approach described below), wherein these spots are used as the reference points that are matched by in the stereo analysis (2) Structured Lighting Referring to FIG. 4, a second embodiment of a 3-D imaging system 14 comprises a light pattern generator 30 to illuminate a target 32 with structured lighting 34, and a camera 36 to view the illuminated target 32. For example, the camera 36 is a high dynamic response CCD or CMOS camera that is sensitive to both visible and infrared frequencies, and that is placed at a base distance b from an infrared light pattern generator 30. The light pattern generator 30, for example, comprises an infrared laser source with a stripe generator that projects a light pattern 38 of multiple parallel lines or stripes on the target 32. The camera 36 captures an image of the target 32, upon which is superimposed the light pattern. The signal to noise ratio of the imaged light pattern 38 can be improved by strobing the light pattern 38 at half the frequency of the frame rate of the camera 36 so that alternate images have the light pattern 38 superimposed on the image of the target 32, and the remaining images do not. Subtracting an image frame without a superimposed light pattern 38 from an adjacent image frame with the superimposed light pattern provides a resultant image—for a stationary background—of substantially only the light pattern 38, as illustrated in FIG. 5. The light pattern 38 can be made brighter than sunlight, even with a relatively lower power density, because the light pattern 38 is strobed and the whole scene can be illuminated for a relatively brief time interval with relatively bright light from the light pattern generator 30. Accordingly, the subtraction process for extracting the light pattern 38 can be done under arbitrary lighting conditions without compromising occupant safety.

Figure 6:
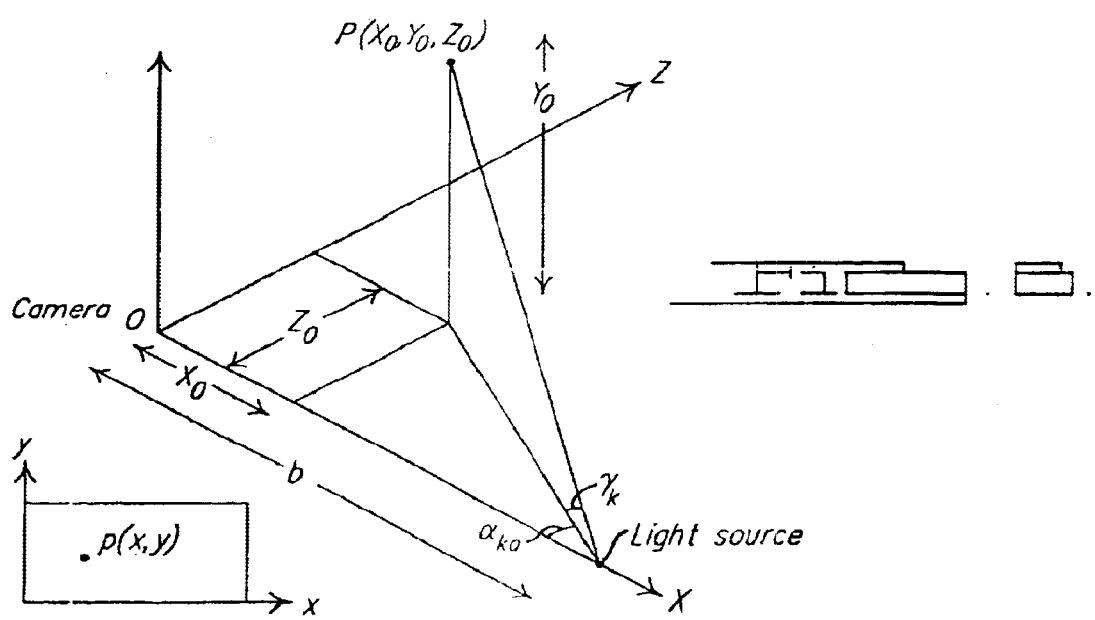
FIG. 6 illustrates a triangulation of a point imaged by a 3-D imaging system using structured lighting.

The spacing of the lines 40 of the light pattern 38 superimposed on the target 32 depends on the distance of the target from the 3-D imaging system 14, and the distortion thereof depends on the shape of the target 32. The actual 3-D coordinates are measured using triangulation of the light spots that constitute the light pattern 38. In FIG. 6, the coordinate system (x,y) of the camera 36 is coincident with the world coordinate system (X, Y, Z); the base separation between the light source and the camera 36 is b and the light source lies on the X axis, i.e. the light source center is at (b,0,0); the Z axis is the optical axis of the camera 36; the focal length of the camera lens is f; so that the image plane lies at Z=f. The exemplary generated light pattern 38 comprises a series of parallel lines 40, for example, N parallel lines 40, wherein each line 40 comprises a collection of light points, for example, M light points on each line 40 (as determined by the resolution of the camera 36). Each line 40 results from the projection of an associated light plane on the target 32. For the $k^{th}$ light plane (generating the $k^{th}$ line) subtending an angle $\gamma_k$ with the ZX plane (k=1, 2, ... N), the projection of the line joining the center of the light source to the $q^{th}$ point of the $k^{th}$ line onto the ZX plane is at angle $\alpha_{kq}$ with respect to the X axis (q=1, 2, ..., M ). If the point P corresponding to the $q^{th}$ point on the $k^{th}$ line is imaged at the point p(x, y) on the image, the world coordinates of P: $(X_0, Y_0, Z_0)$ are given by:

$$X_0 = \frac{bx\tan\alpha_{kq}}{f + x\tan\alpha_{kq}} \quad (4)$$

$$Y_0 = \frac{by\tan\alpha_{kq}}{f + x\tan\alpha_{kq}} \quad (5)$$

$$Z_0 = \frac{bf\tan\alpha_{kq}}{f + x\tan\alpha_{kq}} \quad (6)$$

The coordinates are independent of $\gamma_k$, the angle made by the $k^{th}$ light plane with the ZX plane.

(3) Scanning Laser

Figure 7:
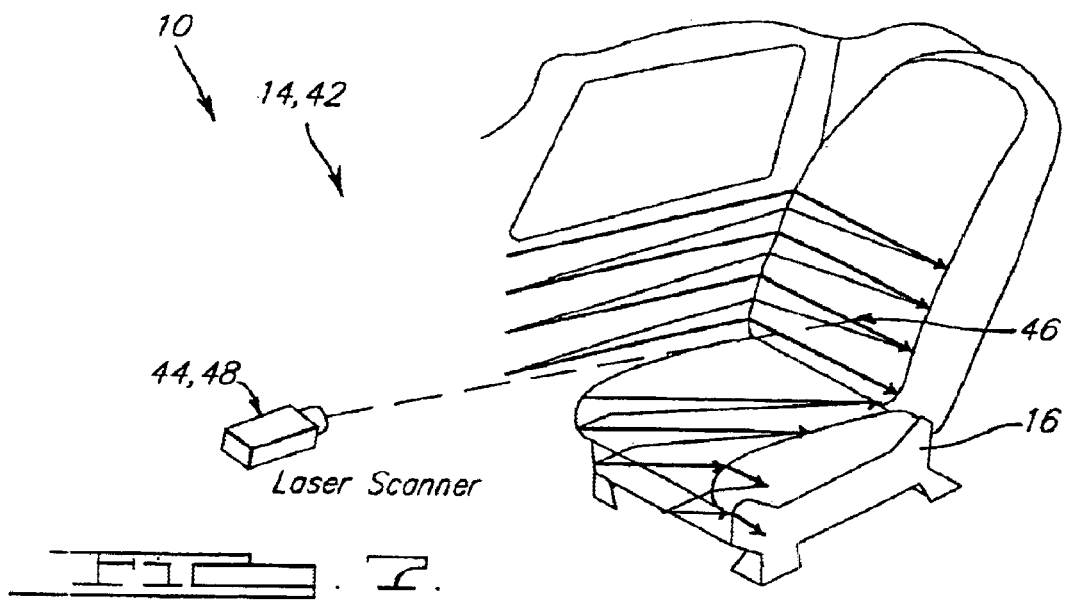
FIG. 7 illustrates a laser scanning system.
Figure 8:
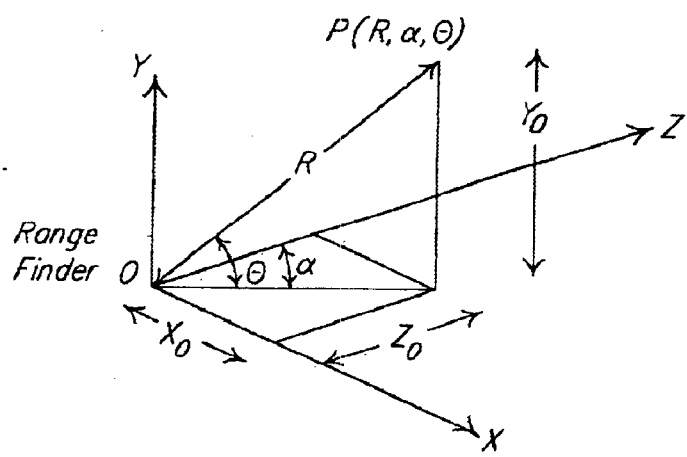
FIG. 8 illustrates a coordinate system of the laser scanning system of FIG. 7.

Referring to FIG. 7, a third embodiment of a 3-D imaging system 14—a scanning laser range finder 42—comprises a scanning laser 44 that scans a laser beam spot 46 across the target 32 in accordance with a raster scan pattern. The range to each point is triangulated by an optical ranging sensor 48, e.g. a photo sensitive detector. Referring to FIG. 8, the 3-D coordinates of the target point P are determined in spherical coordinates $(R,\alpha,\theta)$, where R is the range from the sensor, $\alpha$ and $\theta$ are the azimuth and elevation angles respectively. The azimuth and elevation angles are known from the azimuth and elevation resolution respectively of the scanning system, which for example scans in equal increments. The rectangular coordinates $(X_0, Y_0, Z_0)$ of the target point P are related to the spherical coordinates as follows:

$$X_0 = R \cdot \cos\theta \cdot \sin\alpha \quad (7)$$

$$Y_0 = R \cdot \sin\theta \quad (8)$$

$$Z_0 = R \cdot \cos\theta \cdot \cos\alpha \quad (9)$$

Data Analysis

Figure 19:
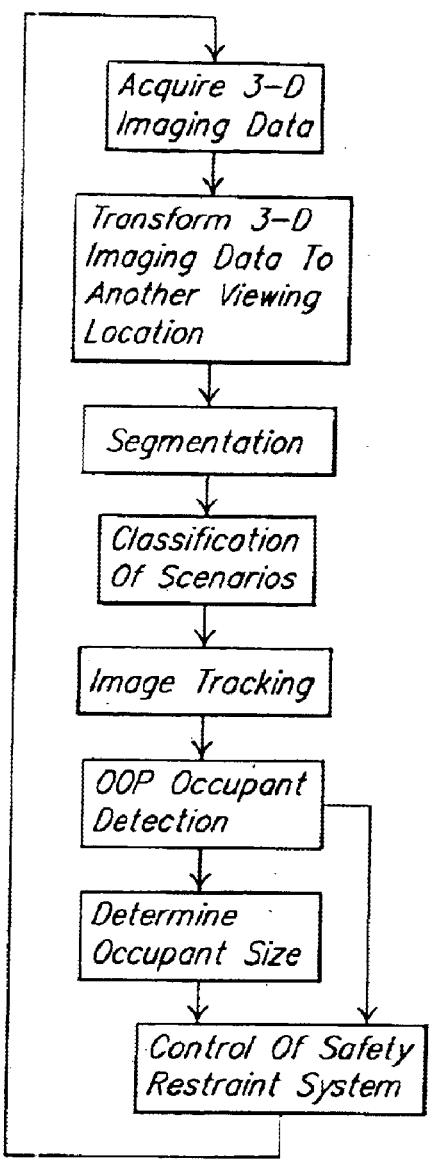
FIG. 19 is a flow chart of a process for sensing an occupant and for controlling a safety restraint system responsive thereto.

Regardless of the 3-D imaging technique, the 3-D imaging system 14 provides a set of 3-D coordinates of the scene. Referring to FIG. 19, the resulting 3-D data is used in an occupant sensing process that can be used for controlling the actuation of a safety restraint system. With the 3-D imaging system 14 installed in the vehicle, the location—i.e. the orientation and position—of the coordinate systems of the camera(s) and the world coordinate system are fixed. The 3-D coordinates of a point on a target 32 can be expressed with respect to any world coordinate system at any position and orientation using coordinate transformations. In other words, the 3-D image taken from the fixed location at the headliner can be effectively viewed from any other location of choice (for example, from the headliner, either of the A-pillars, the dashboard, the driver side or other locations) by using one or more coordinate transformations.

Figure 10:
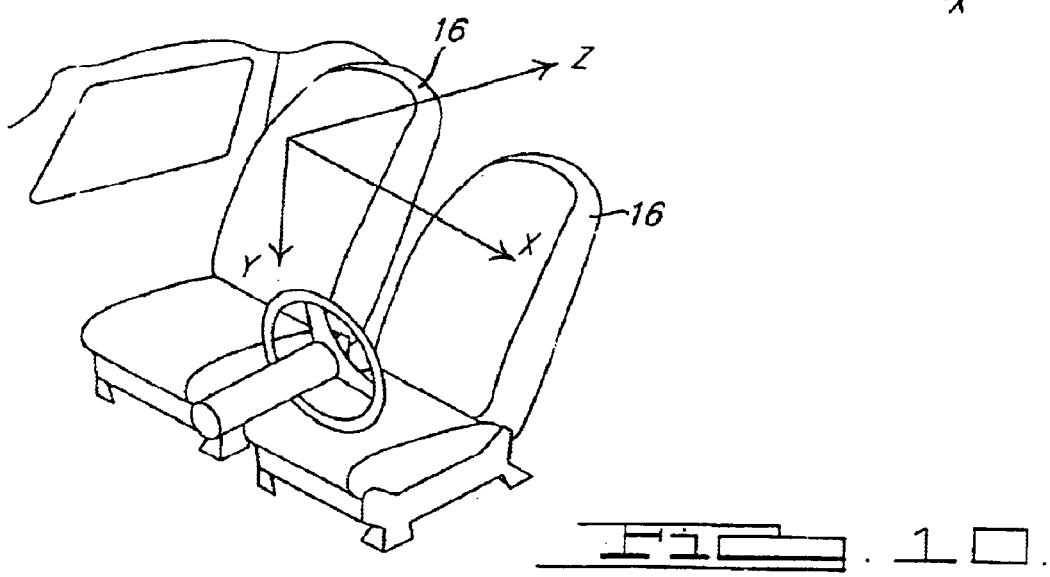
FIG. 10 illustrates a coordinate system in a vehicle.
Figure 9A:
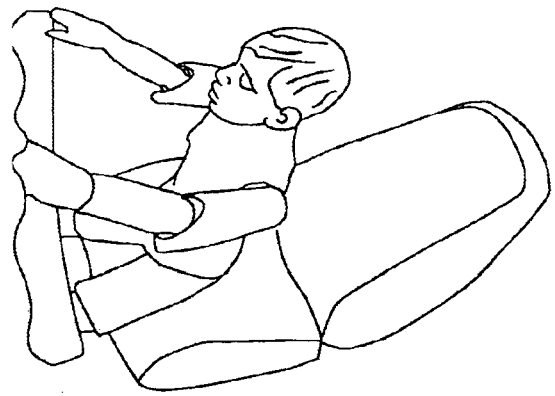
FIGS. 9a, 9b, 9c and 9d illustrate viewing perspectives from the headliner, the driver side, the front, and the top respectively, of an occupant in the passenger side of a vehicle.
Figure 9B:
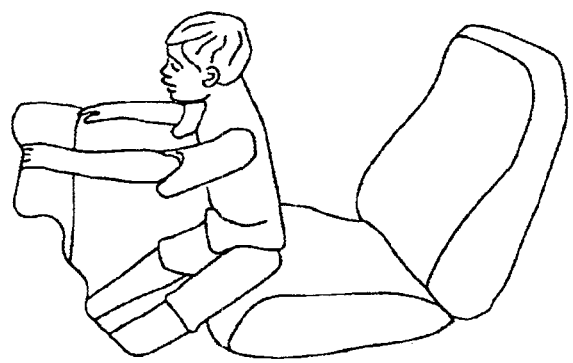
Figure 9C:
Figure 9D:
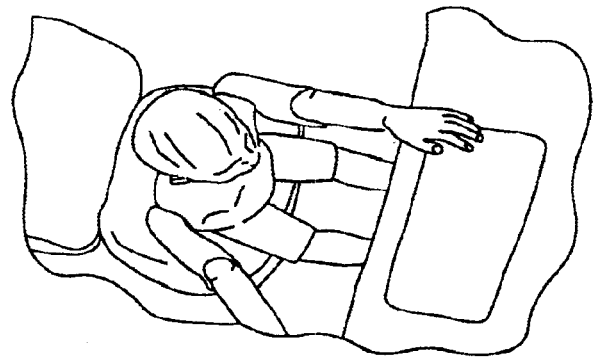
Figure 11:
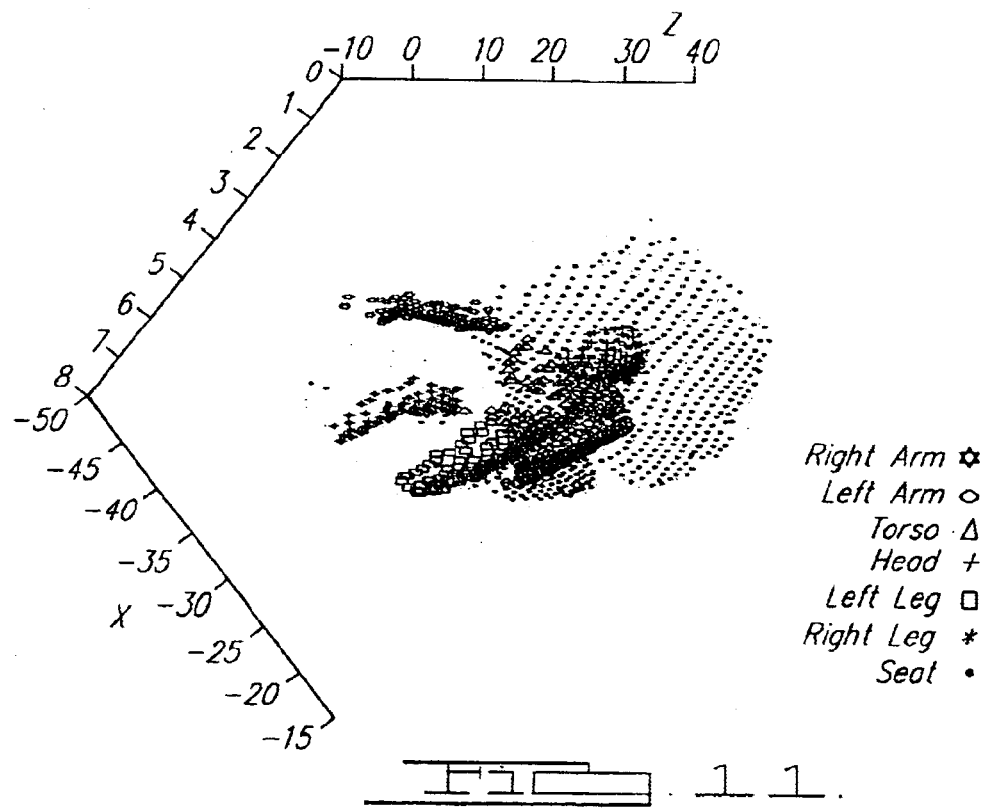
FIG. 11 illustrates an image of a passenger leaning forward, viewed from the headliner.
Figure 12:
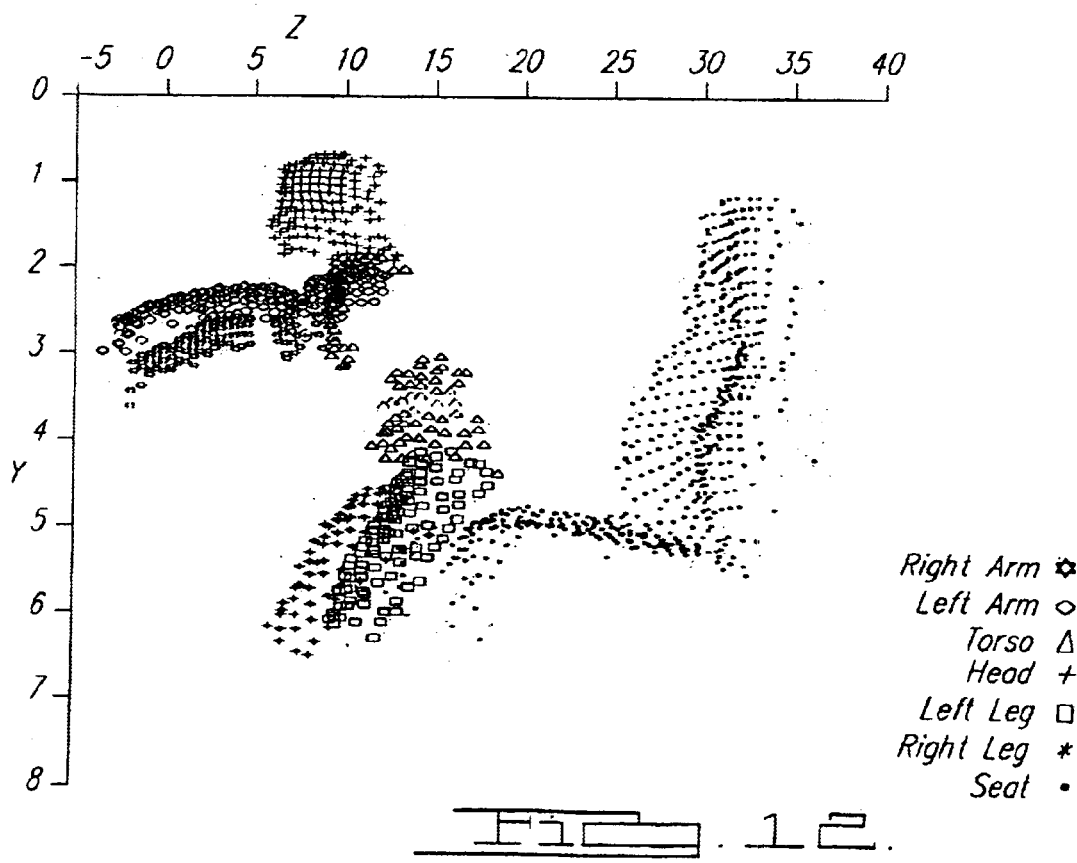
FIG. 12 illustrates an image of a passenger leaning forward, viewed from the driver side using coordinate transformations.
Figure 13:
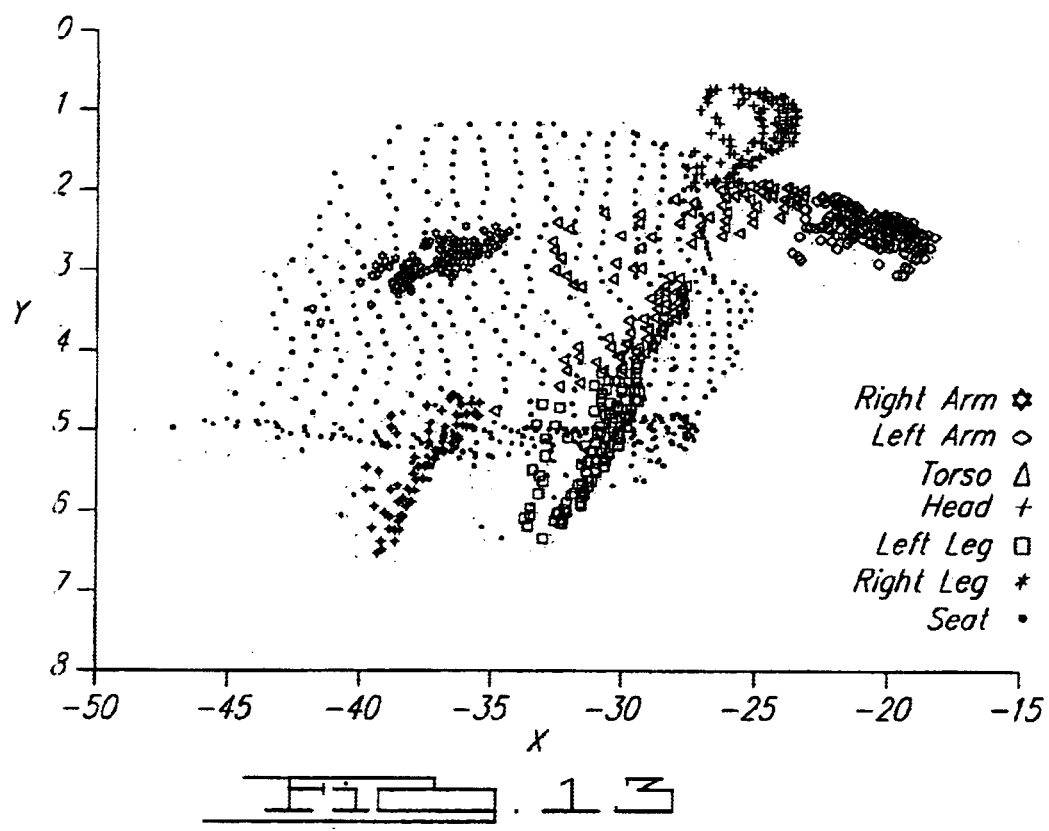
FIG. 13 illustrates an image of a passenger leaning forward, viewed from the front using coordinate transformations.
Figure 14:
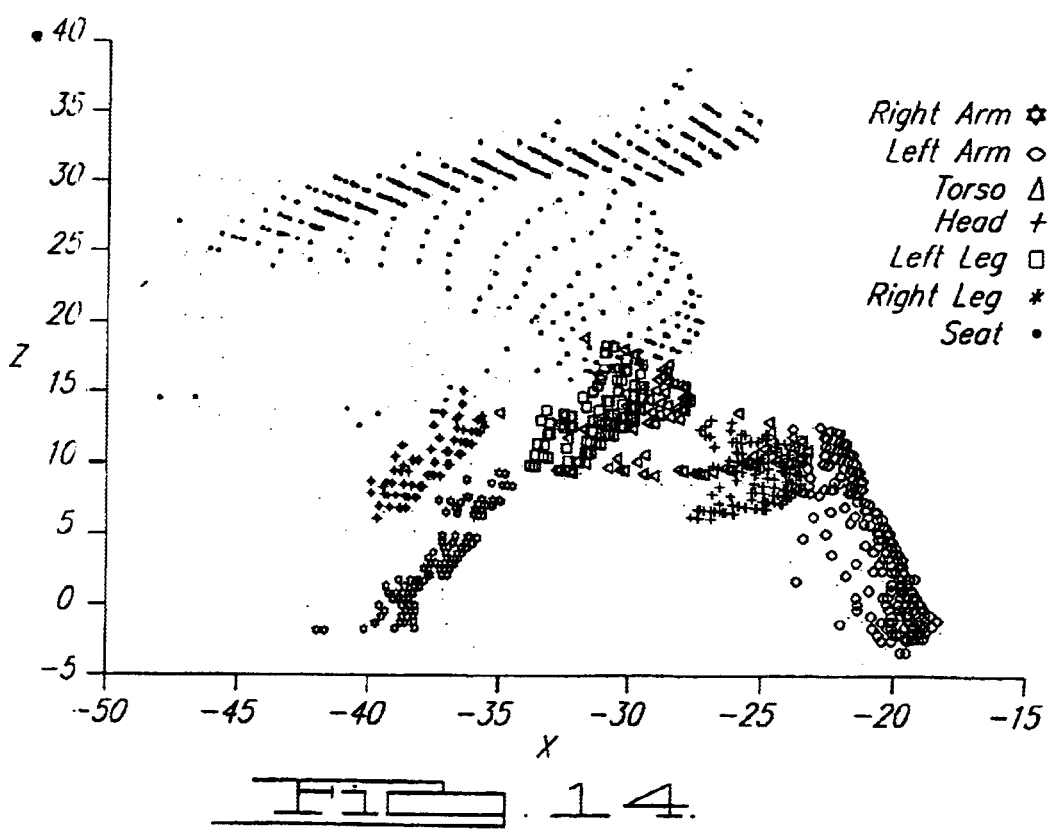
FIG. 14 illustrates an image of a passenger leaning forward, viewed from the top using coordinate transformations.
Figure 15:
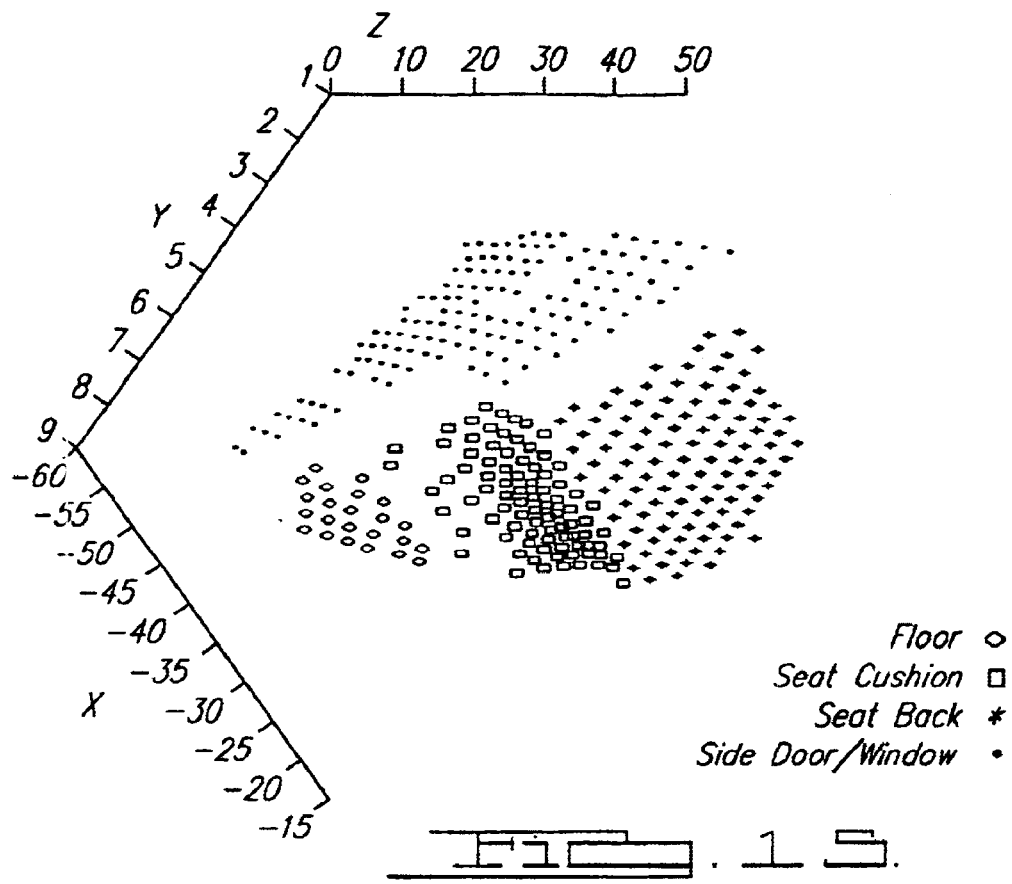
FIG. 15 illustrates an image of an empty seat, viewed from the headliner.
Figure 16:
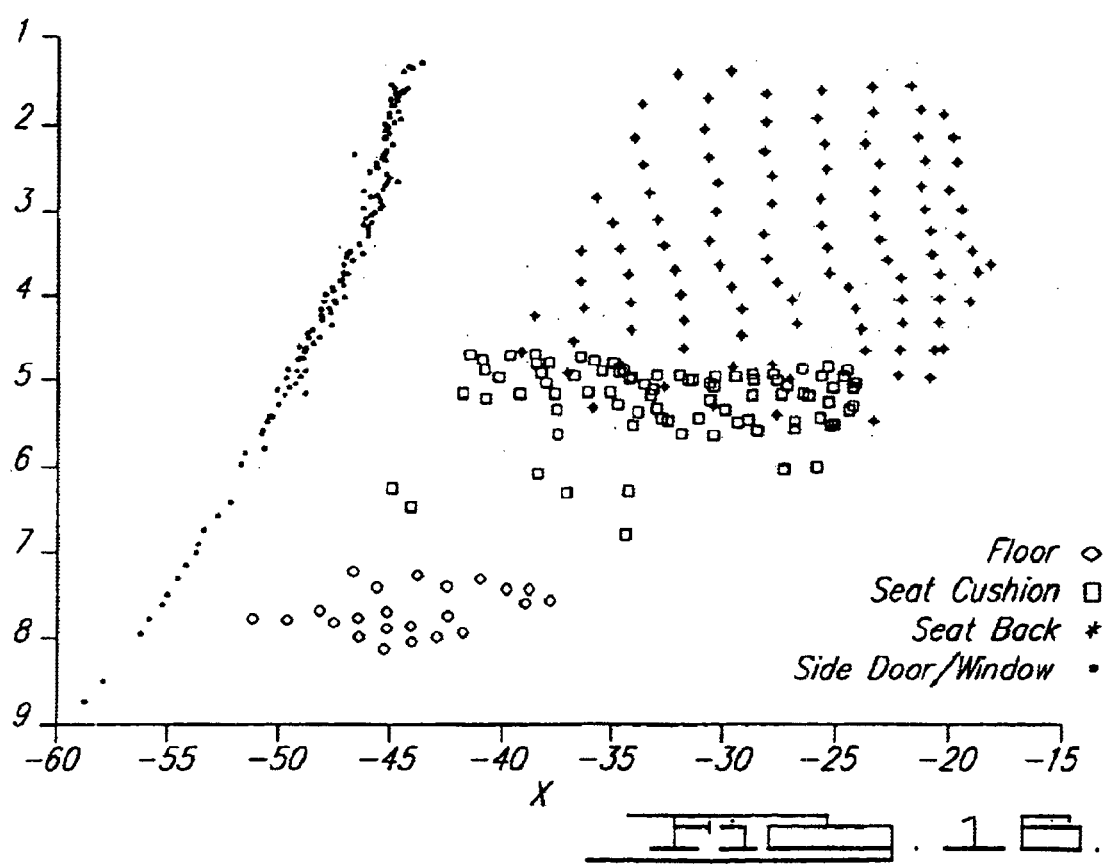
FIG. 16 illustrates an image of an empty seat, viewed from the driver side using coordinate transformations.
Figure 17:
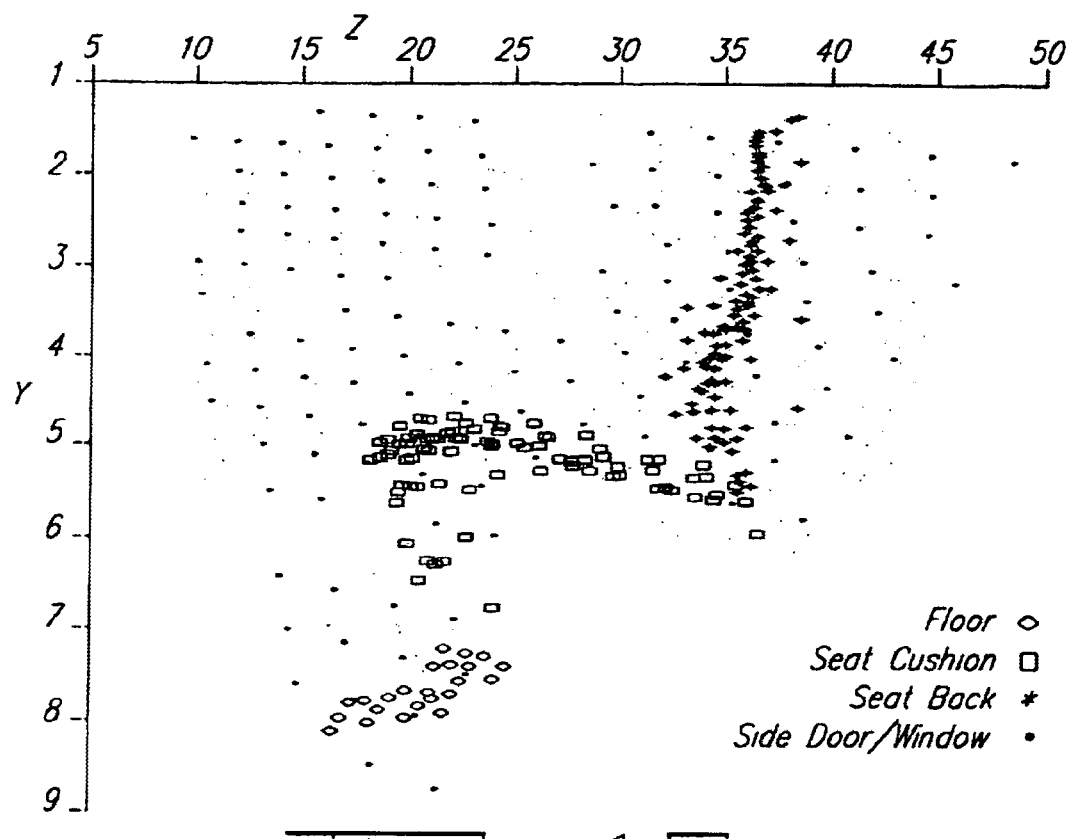
FIG. 17 illustrates an image of an empty seat, viewed from the front using coordinate transformations.
Figure 18:
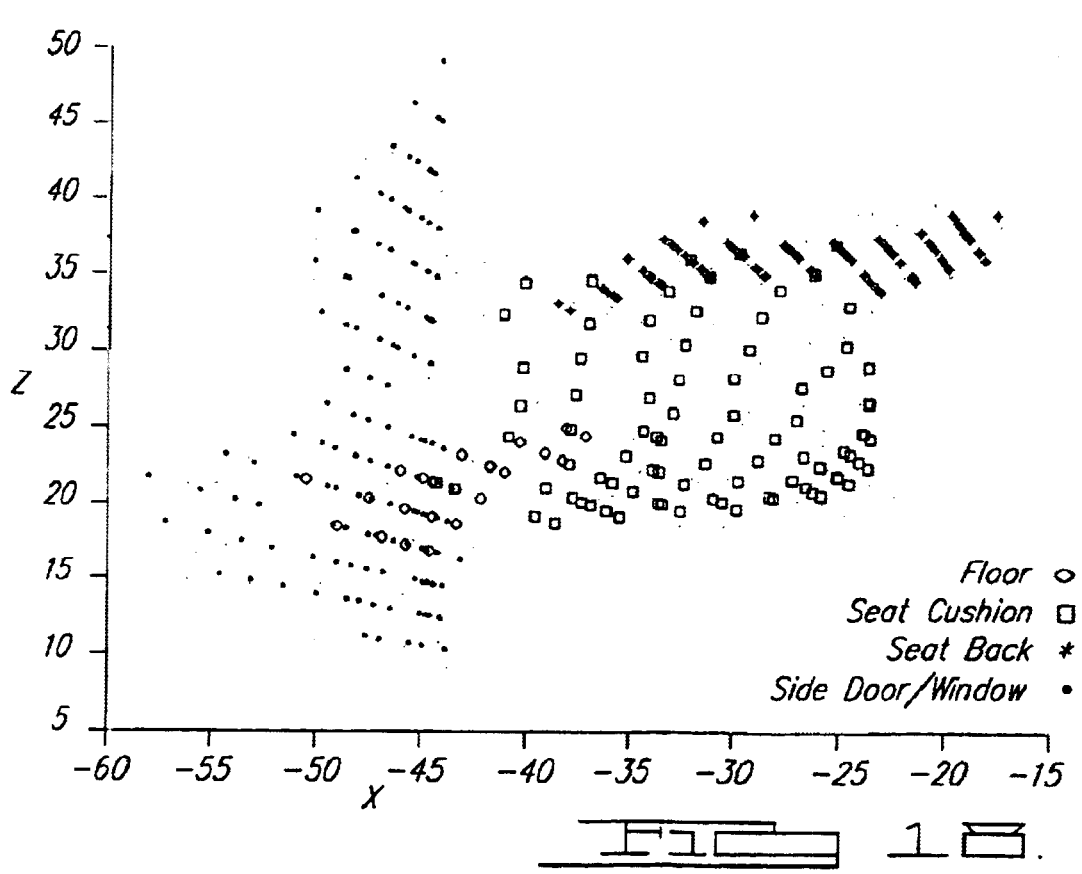
FIG. 18 illustrates an image of an empty seat, viewed from the top using coordinate transformations.

As an example, FIGS. 9a–d illustrate a laboratory setup of a vehicle interior buck viewed from four different perspectives as follows: from headliner (FIG. 9a), from the driver side (FIG. 9b), from the front (FIG. 9c) and from the top (FIG. 9d). Referring to FIG. 10, for the coordinate system origin at the headliner above the rear view mirror as illustrated in FIG. 9a, the positive x axis is horizontal and towards the driver side, the positive y axis is vertical and towards the floor and the positive z axis is horizontal and towards the back of the vehicle. 3-D image data, respectively of an occupant seated leaning slightly forward and the empty seat, was collected from this location using an infrared scanning laser range finder 42. The respective images from the headliner location are shown in FIGS. 11 and 15 respectively. These same images are respectively transformed to the viewing perspectives of the driver side, the front and the top by transformation of coordinate systems, as shown in FIGS. 12 through 14 respectively for the occupant seated leaning slightly forward, and in FIGS. 16 through 18 respectively for the empty seat.

Segmentation of the Scene

Figure 20:
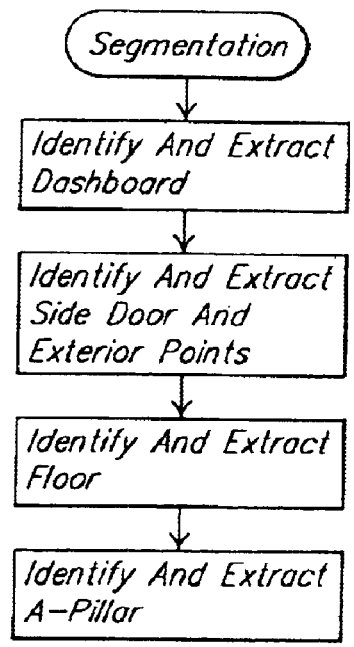
FIG. 20 is a flow chart of a segmentation process.

As used herein, the term segmentation means the extraction from the image of a region of interest (ROI) that contains useful information. Referring to FIGS. 19 and 20, the side door, A-pillar, dashboard, floor and objects outside the window are all examples of background clutter that can be and preferably are eliminated from the image by segmentation, leaving as a remainder the ROI. This reduces the number of data points that need to be processed by a recognition algorithm.

The dashboard, side door and the floor can be characterized as fixed planes. For example, the plane representing the side door can be characterized as:

$$g \cdot x + h \cdot y + i \cdot z = n \quad (10)$$

With the door closed—as would be the case with the vehicle in motion—this plane is fixed and g, h, i and n are fixed parameters of the vehicle. The points on the door are eliminated by comparing a linear combination of the data points (X, Y, Z) with a threshold, as follows:

$$g \cdot X + h \cdot Y + i \cdot Z - n < T_0 \text{ (threshold)} \quad (11)$$

wherein those points satisfying equation (11) are sufficiently close to the fixed plane to be assumed to be associated with the door.

Similar calculations are done for the dashboard and the floor to eliminate the visible portions of these features. The A-pillar is characterized by a fixed curved surface, the parameters of which depend on the particular vehicle:

$$f(x, y, z) = s \quad (12)$$

If the function $f(x, y, z)$ cannot be expressed in a standard form, then the function can, for example, be characterized by a least squares fit of a functional form, using the actual 3-D coordinates of the A-pillar. The same process can be used in modeling a dashboard of a nonstandard shape. The visible portion of the A-pillar, and other visible features such as the dashboard that are similarly characterized, are eliminated from the image using the criterion:

$$f(X, Y, Z) - s < T_1 \text{ (threshold)} \quad (13)$$

Points outside the side window—for example, having large negative x coordinates—are discarded by comparing with a threshold $T_2$ corresponding to the distance from the origin of the coordinate system to the side door plane that is roughly parallel to the YZ plane. Therefore, the point (X Y, Z) is outside if:

$$X < -T_2 \quad (14)$$

If the image is not of an empty seat (method of detecting empty seats is described below), then the portion of the empty seat that is visible is also be segmented out.

Classification of Scenarios

Figure 21:
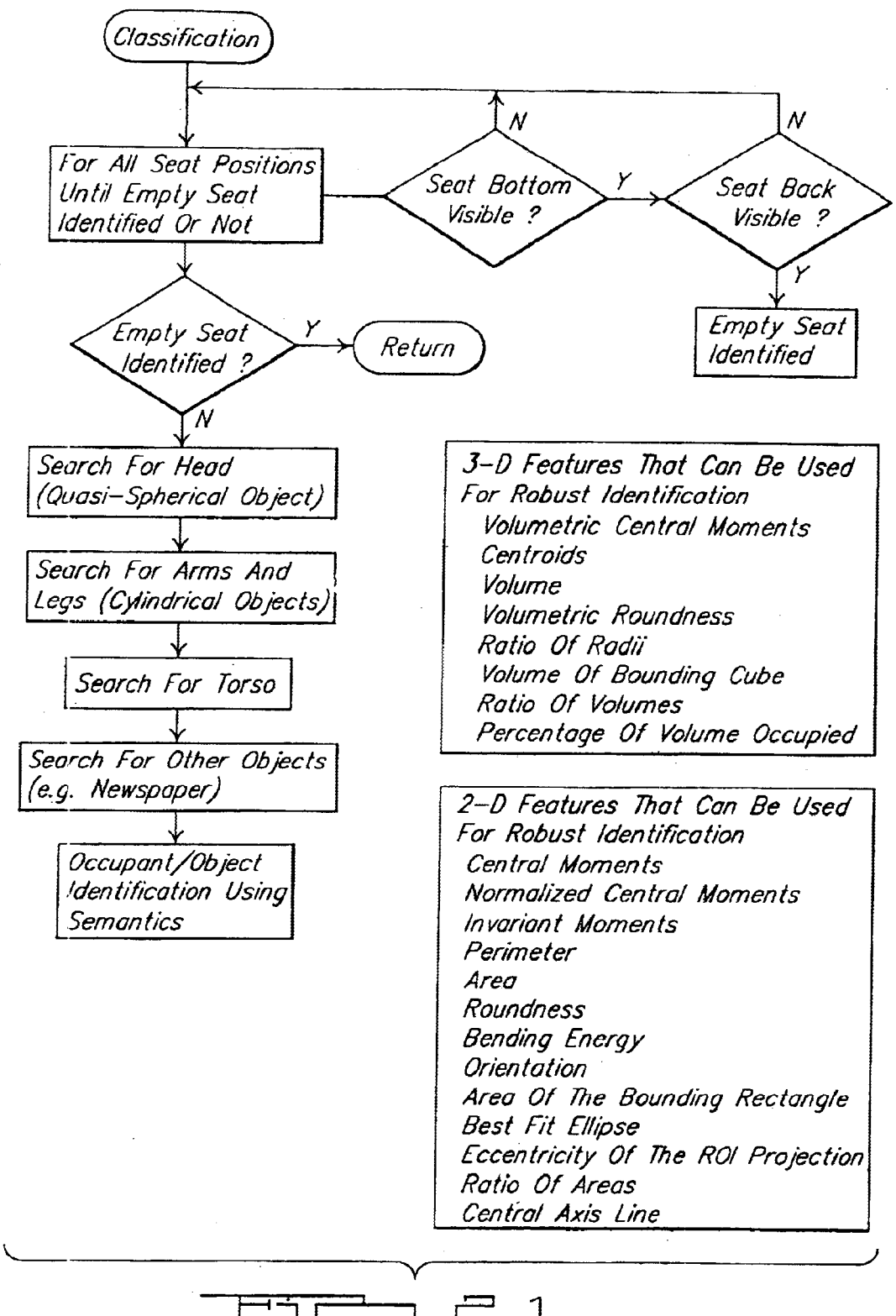
FIG. 21 is a flow chart of a classification process.

Referring to FIGS. 19 and 21, following the segmentation of the image, the image is analyzed to determine whether or not the seat is empty. For an empty seat, the image comprises a seat cushion (bottom) and a seat back, which can be respectively characterized by two respective planes—a first plane characterizing the seat cushion and a second plane, at an angle relative to the first, characterizing the seat back.

An equation of a seat back plane, for the seat back completely reclined and the seat cushion fully forward and horizontal, is given by:

$$d \cdot x + e \cdot y + f \cdot z = m \quad (15)$$

wherein the parameters d, e, f and m are fixed for a particular vehicle. The angle of the seatback and the position and recline of the seat cushion are all variable, so the equation of the seat back plane is a function of these three factors. Referring to FIG. 10, the seat cushion travels principally along the Z axis. Moreover, the seat back rotates about an axis that is substantially parallel to the seat base and to the X axis, which is also substantially parallel and close to a roughly straight line given by the intersection of the seat back and the seat cushion planes. The equation of the seat back plane, for a given position and slope of the seat cushion and a given recline of the seat back, are determined by first applying a translational transformation matrix T that provides a translation along the Z axis, and then applying a rotational transformation matrix $R_\alpha$ to account for the rotation with respect to the X axis. If $\Delta z$ and $\Delta \alpha$ represent a significant change in the seat cushion travel and the seat back angle, then any given translation z of the seat cushion from the front-most position, and any given rotation angle $\alpha$ of the seat back from the complete recline position, can be represented by multiples of $\Delta z$ and $\Delta \alpha$ respectively, wherein $\Delta z$ and $\Delta \alpha$ are parameters of the particular vehicle.

More particularly, the equation of the seatback plane for a given translation z of the seat cushion and recline α of the seat back is determined from the following operations:

The translational transformation matrix T is given by:

$$T = \begin{bmatrix} 1 & 0 & 0 & 0 \\ 0 & 1 & 0 & 0 \\ 0 & 0 & 1 & z \\ 0 & 0 & 0 & 1 \end{bmatrix} \quad (16)$$

The rotational transformation matrix $R_\alpha$ is given by:

$$R_\alpha = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (17)$$

The new coordinates (x', y', z') are determined from the old coordinates (x, y, z) by $$\begin{bmatrix} x' \\ y' \\ z' \\ 1 \end{bmatrix} = \begin{bmatrix} 1 & 0 & 0 & 0 \\ 0 & 1 & 0 & 0 \\ 0 & 0 & 1 & z \\ 0 & 0 & 0 & 1 \end{bmatrix} \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \begin{bmatrix} x \\ y \\ z \\ 1 \end{bmatrix} \quad (18)$$

$$= \begin{bmatrix} x \\ y\cos\alpha + z\sin\alpha \\ -y\sin\alpha + z\cos\alpha + z \\ 1 \end{bmatrix}$$

The equation of a plane characterizing the seat back is given from equation (18) by:

$$d_{\alpha,z} \cdot x + e_{\alpha,z} \cdot y + f_{60,z} \cdot z = m_{\alpha,z} \quad (19)$$

where, $$d_{\alpha,z} = d \quad (20)$$

$$e_{\alpha,z} = e \cdot \cos\alpha - f \cdot \sin\alpha \quad (21)$$

$$f_{\alpha,z} = e \cdot \sin\alpha + f \cdot \cos\alpha + f \quad (22)$$

$$m_{\alpha,z} = m \quad (23)$$

A seat cushion at a horizontal tilt and an arbitrary translational position is characterized by the plane:

$$a \cdot x + b \cdot y + c \cdot z = k \quad (24)$$

wherein the parameters a, b, c and k are fixed for a particular vehicle. The equation of the plane for any other tilt of the seat cushion is found by applying the above described rotational transformation about the X axis.

Clusters of points lying on the seat cushion plane of equation (24) and seat back plane of equation (19) are checked to see if they form the rough shape of the seat cushion and back respectively, by checking test points (X, Y, Z) to see if the following equations are satisfied:

$$a \cdot X + b \cdot Y + c \cdot Z - k < T_3 \text{ (threshold)} \quad (25)$$

$$d_{\alpha,z} \cdot X + e_{\alpha,z} \cdot Y + f_{\alpha,z} \cdot Z - m_{\alpha,z} < T_4 \text{ (threshold)} \quad (26)$$

for all possible combinations of seat cushion position and seat cushion slope and seat back angle.

If a seat bottom is not detected, the seat is assumed occupied, wherein the possible seat occupancy scenarios are for example forward facing infant or child seat (FFIS), RFIS or an occupant. This is done generally from the volumetric shape of the region of interest. The seat back may or may not be visible, and visible portions of the seat are segmented out of the image.

Once the scene is identified in a 'macro' level, individual parts of the scene are identified. For example, the image is then searched to find a somewhat spherical shape representing a head. Referring to FIG. 11, the image of the target has a dominant spherical region. The search begins by finding a roughly spherical surface satisfying the equation $(x-a_h)^2 + (y-b_h)^2 + (z-c_h)^2 = r_h^2$, where $(a_h, b_h, c_h)$ is the centroid of the spherical region and $r_h$ is the radius. The search begins with a reasonable guess as to where the head is likely to be in 3-D space for the particular vehicle, after which the position of the center of the sphere, and the radius of the sphere, are respectively iterated by the search.

The image is then searched to find cylindrical surfaces representing the arms and legs. The torso, is characterized by a relatively flat surface. Semantics are used—a spherical surface (head) with two cylindrical surfaces (arms) on both sides, a relatively less curved surface (torso) below the spherical surface (head) and in between the two cylindrical surfaces (arms), the cylindrical surfaces (arms) originating from the top of the less curved surface (torso), two more cylindrical surfaces (legs) originating from the bottom of the less curved surface (torso)—all indicate an occupant. The size of these features can be roughly determined to distinguish the size of the occupant, e.g. large, medium or small.

Figure 22A:
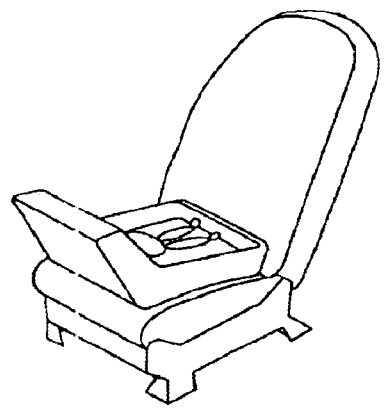
FIGS. 22a and 22b respectively illustrate an uncovered, and a covered, rear facing infant seat located on a passenger seat of a vehicle.
Figure 22B:
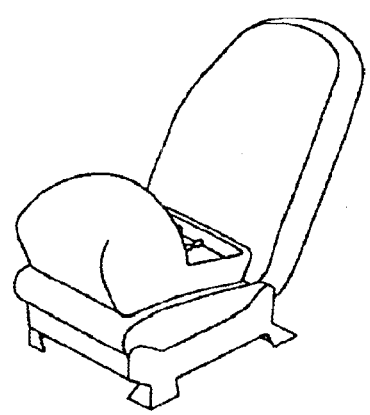

If the seat is occupied and none of the above are observed, the likely candidate is a RFIS. Referring to FIGS. 22a and 22b, a RFIS may be uncovered or covered. A substantial portion of the seat back is visible for either of these cases, but more so with the uncovered RFIS. A 'kidney bean' shape is indicative of the uncovered RFIS, in which case two small cylindrical surfaces maybe visible on the right representing the legs of the infant. A somewhat smooth surface is indicative of a covered RFIS.

Figure 23:
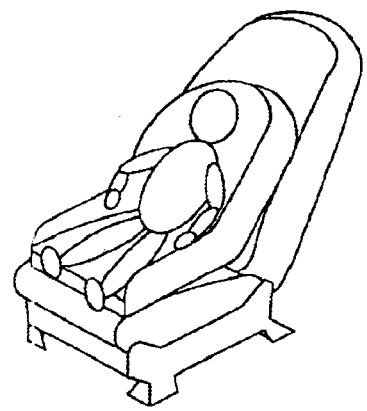
FIG. 23 illustrates a front facing infant seat located on a passenger seat of a vehicle.

Referring to FIG. 23, an occupant in a FFIS or booster seat is indicated if all of the above limbs are visible and they are relatively small, and if the occupant is not seated directly on the seat, but is somewhat raised thereabove, as indicated by an outer boundary of the occupant zone that is not completely planar. A child in a booster seat is indicated if the seatback is visible but the occupant is seated on a raised surface, as determined by looking at the buttocks region to see how far it is from the seat cushion plane.

Figure 24:
FIG. 24 illustrates a belted occupant seated on a passenger seat of a vehicle.

Referring to FIG. 24, seatbelt usage may also be determined from surface characteristic, for example, the presence of a somewhat elongated and arched surface.

Figure 25:
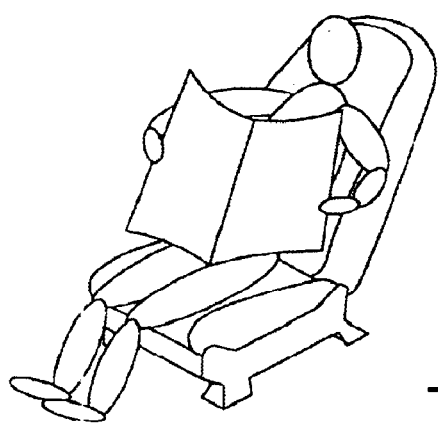
FIG. 25 illustrates an occupant reading a newspaper seated on a passenger seat of a vehicle.
Figure 26A:
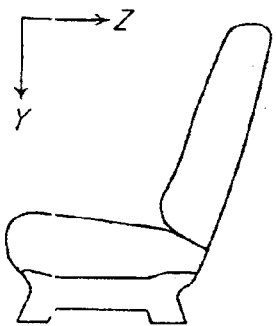
FIGS. 26a, 26b and 26c illustrate projections of an empty seat, on the YZ, XZ and XY planes respectively.
Figure 26B:
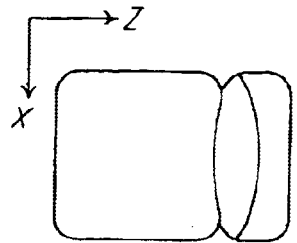
Figure 26C:
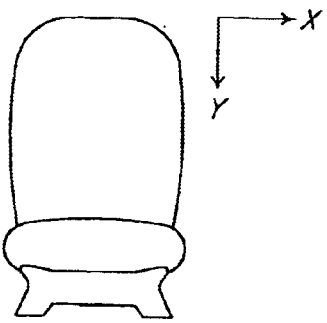

Referring to FIG. 25, an occupant reading a newspaper is identified by looking for a large planar surface on the left of the scene and likely a spherical surface because the head may be seen from over the newspaper.

Aside from the modeling shapes of the surfaces, mathematical features are also used for robust classification of features, wherein shape descriptors are applied to the 3-D segmented ROI for volumetric analysis. Furthermore, the projections of the volume on the XY, YZ, and ZX planes—respectively corresponding to the front, side and top views of the ROI volume respectively shown in FIGS. 13, 12 and 14—are analyzed in 2-D. Most of the individual features cannot alone distinguish between scenarios, but may individually distinguish between certain properties of the scenarios. Accordingly, all the features are combined in a feature vector that is formed for an overall classification.

3-D Features

The 3-D features are given, for example, as follows:

(1) Volumetric Central Moments: Central moments are shape descriptors independent of the position of the ROI. The central moment of order p, q, r (p,q,r=0, 1, 2 . . . ) is defined by:

$$\mu_{pqr} = \sum_x \sum_y \sum_z (x - \bar{x})^p (y - \bar{y})^q (z - \bar{z})^r \qquad (27)$$

where $(\bar{x}, \bar{y}, \bar{z})$ is the centroid of the ROI from equations (29–31). The moment of order p, q, r is defined by:

$$m_{pqr} = \sum_x \sum_y \sum_z x^p y^q z^r \qquad (28)$$

Moments are essentially shape descriptors. However they are dependent on the spatial position of the object. Equation (27) provides for spatial invariance so that the moment values will be the same for similar ROI's regardless of their corresponding location in the vehicle. For example, the central moments of a RFIS would be the same for any position of the vehicle seat.

(2) Centroids $$\bar{x} = \frac{m_{100}}{m_{000}} \qquad (29)$$

$$\bar{y} = \frac{m_{010}}{m_{000}} \qquad (30)$$

$$\bar{z} = \frac{m_{001}}{m_{000}} \qquad (31)$$

Centroids provide a position in 3-D space that can be a useful indicator of the seat occupancy scenario. For example, referring to FIG. 10, a RFIS would be closer to the instrument panel, thus having a lower $\bar{z}$ value, than would a normally seated occupant having a higher $\bar{z}$ value. The $\bar{x}$ value provides the lateral position of the target, thus providing an indication if an occupant is seated in the middle of a bench seat. The $\bar{y}$ centroid enables tall objects to be distinguished from short objects—a RFIS tends to be lower thus having a lower $\bar{y}$ value as compared to that of a normally seated occupant.

(3) Volume $$V = m_{000} \qquad (32)$$

Occupants, child seats and empty seats typically have different volumes. This feature is especially useful in determining the size of the occupant, once the image has been classified.

(4) Volumetric Roundness: This is a measure of the roundness of the ROI ranging from 0 to 1, where 1 corresponds to a perfectly spherical ROI, as given by:

$$R_v = 6 \cdot \pi^2 \cdot V / p_v^3 \qquad (33)$$

where, V is the volume and $p_v$ is the average of the perimeters of the projections of the ROI on the XY, YZ and ZX planes. Child seats tend to be more 'spherical' than people. Moreover, the empty seat has a different roundness.

(5) Ratio of Radii: A radius is a line segment joining the centroid to any point on the outer boundary of the ROI. The ratio of the maximum ($R_{max}$) and minimum ($R_{min}$) radii is a feature, as given by:

$$r_R = R_{max} / R_{min} \qquad (34)$$

This measure is roughly analogous to aspect ratio—'thinner' objects, for example occupants and empty seats, typically have a higher value than 'compact' objects, for example child seats.

(6) Volume of the Bounding Cube: The geometric mean of the areas of the bounding rectangles for the three projections of equation (56) is the volume of the bounding cube, as given by:

$$V_B = \sqrt{A_{Bxy} A_{Byz} A_{Bzx}} \qquad (35)$$

where, $A_{Bxy}$=Area of the rectangle bounding the XY projection of the 3-D ROI;

$A_{Byx}$=Area of the rectangle bounding the YZ projection of the 3-D ROI; and $A_{Bzx}$=Area of the rectangle bounding the ZX projection of the 3-D ROI.

This is another way of analyzing the volume of the target.

(7) Ratio of Volumes: This is the ratio of the actual volume V to that of the bounding cube $V_B$, as given by:

$$R_v = V / V_B \qquad (36)$$

Targets with large portions sticking out from the main body, for example an occupant with stretched arms, will have a large $V_B$ compared to its volume V since a large portion of the bounding rectangles typically contain more than the projections of the ROI. Child seats, which generally do not have large objects jutting out therefrom, typically are characterized by a value of $R_V$ close to 1, whereas occupants with hands extended or legs on the dashboard would have a much lower value of $R_V$.

(8) Percentage Volume Occupied: Referring to FIG. 30, the region in front of the seat cushion known as the Leg Occupancy Region is likely to be occupied by the legs of the occupant and is likely to be empty for RFIS, FFIS and empty seats. Thus the ratio of the portion of the volume ($V_o$) of the ROI occupying this region to the volume $V_p$ of the region is likely to be high for occupants and low for RFIS, FFIS and empty seats. This ratio is given by:

$$R_{Vp} = V_o / V_p \qquad (37)$$

2-D Features

Referring to FIGS. 26 through 31, the 2-D features calculated on the three projections of the ROI provide substantial shape information. These 2-D features are illustrated hereinbelow for the projection on the XY plane. The corresponding features for the projections on the YZ and ZX planes are determined by replacing (x, y) by (y, z) and (z, x) respectively:

(1) Central Moments: Central moments are position independent shape descriptors, and are given by:

$$\mu_{pq} = \sum_x \sum_y (x - \bar{x})^p (y - \bar{y})^q \qquad (38)$$

wherein the centroids are given by:

$$\bar{x} = \frac{m_{10}}{m_{00}} \qquad (39)$$

-continued $$\bar{y} = \frac{m_{01}}{m_{00}} \quad (40)$$

(2) Normalized central moments: These shape descriptors are rotation, scale and translation independent, and are given by:

$$\eta_{pq} = \frac{\mu_{pq}}{\mu_{00}^{\gamma}} \quad (41)$$

where, $$\gamma = \frac{p+q}{2} + 1 \quad (42)$$

(3) Invariant Moments: These scale, rotation and translation invariant moments are robust shape descriptors (*Digital Image Processing*, Gonzalez, Woods), and are given by:

$$\phi_1 = \eta_{20} + \eta_{02} \quad (43)$$

$$\phi_2 = (\eta_{20} - \eta_{02})^2 + 4\eta_{11}^2 \quad (44)$$

$$\phi_3 = (\eta_{30} - 3\eta_{12})^2 + (3\eta_{21} - \eta_{03})^2 \quad (45)$$

$$\phi_4 = (\eta_{30} + \eta_{12})^2 + (\eta_{21} + \eta_{03})^2 \quad (46)$$

$$\phi_5 = (\eta_{30} - 3\eta_{12})(\eta_{30} + \eta_{12})[(\eta_{30} + \eta_{12})^2 - 3(\eta_{21} + \eta_{03})^2] + \quad (47)$$
$$(3\eta_{21} - \eta_{03})(\eta_{21} + \eta_{03})[3(\eta_{30} + \eta_{12})^2 - (\eta_{21} + n_{03})^2]$$

$$\phi_6 = (\eta_{20} - \eta_{02})[(\eta_{30} + \eta_{12})^2 - (\eta_{21} + \eta_{03})^2] + 4\eta_{11}(\eta_{30} + \eta_{12})\eta_{21} + \eta_{03} \quad (48)$$

$$\phi_7 = (3\eta_{21} - \eta_{30})(\eta_{30} + \eta_{12})[(\eta_{30} + \eta_{12})^2 - 3(\eta_{21} + \eta_{03})^2] + \quad (49)$$
$$(3\eta_{12} - \eta_{30})(\eta_{21} + \eta_{03})[3(\eta_{30} + \eta_{12})^2 - (\eta_{21} + n_{03})^2]$$

(4) Perimeter: The perimeter is a measure of the size of the ROI, and is given by:

$$p = \sum_{i=1}^{M} \sqrt{(x_i - x_{i-1})^2 + (y_i - y_{i-1})^2} \quad (50)$$

The perimeter of the projection of an empty seat is likely to be less than that of an occupied seat.

(5) Area:

$$A = m_{00} \quad (51)$$

The area of the projection of an empty seat is likely to be less than that of a RFIS, FFIS or occupant.

(6) Roundness: The roundness of the projection is 1 for perfect circles and less than 1 for other shapes, and is given by:

$$R = 4\pi A/p^2 \quad (52)$$

A RFIS would have a different measure of roundness than an occupant or an empty seat.

(7) Bending Energy: The bending energy is a measure of the curves in the shape of the projections (*Fundamentals of Digital Image Processing*, Anil K. Jain), and is given by:

$$E_b = \frac{1}{p} \int_0^p |k(t)|^2 \, dt \quad (53)$$

$$k(t) = \sqrt{\left(\frac{d^2 x}{dt^2}\right)^2 + \left(\frac{d^2 y}{dt^2}\right)^2} \quad (54)$$

and t is the distance along the perimeter from any arbitrary starting point on the perimeter. The bending energy is high for shapes with many sharp bends as would result for occupants. Child seats would tend to have a lower value of bending energy.

Figure 34A:
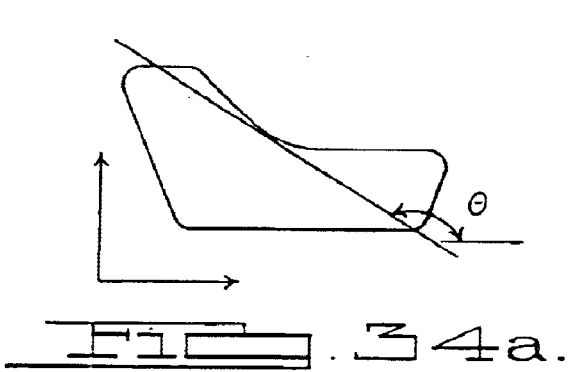
FIGS. 34a and 34b illustrate an orientation measure for a rear facing infant seat (RFIS) and a normally seated occupant, respectively.
Figure 34B:
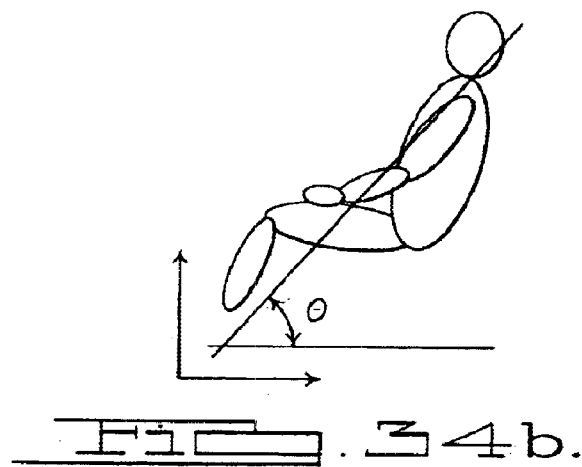

(8) Orientation: Referring to FIG. 34, this is a measure of the angle the projection makes with the independent axis, and is given by:

$$\theta = \frac{1}{2} \tan^{-1}\left(\frac{2\mu_{11}}{\mu_{20} - \mu_{02}}\right) \quad (55)$$

Figure 27A:
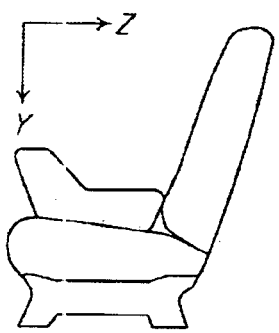
FIGS. 27a, 27b and 27c illustrate projections of a rear facing infant seat, on the YZ, XZ and XY planes respectively.
Figure 27B:
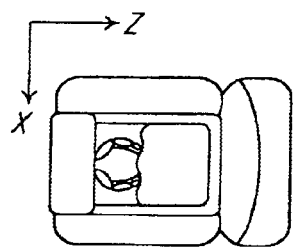
Figure 27C:
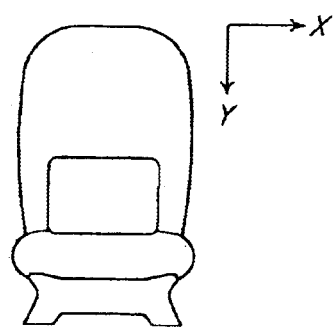
Figure 28A:
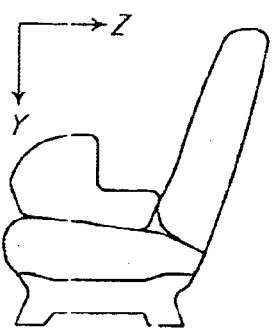
FIGS. 28a, 28b and 28c illustrate projections of an covered rear facing infant seat, on the YZ, XZ and XY planes respectively.
Figure 28B:
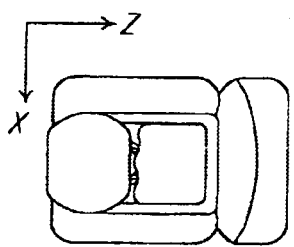
Figure 28C:
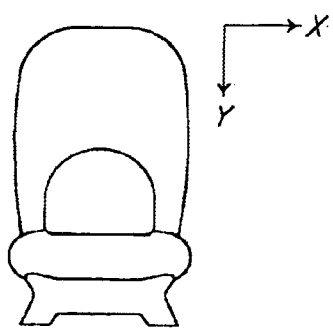
Figure 29A:
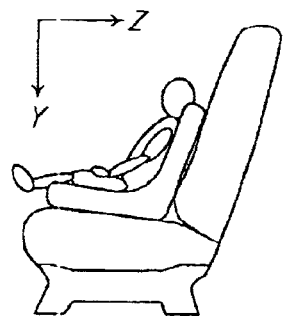
FIGS. 29a, 29b and 29c illustrate projections of a front facing infant, on the YZ, XZ and XY planes respectively.
Figure 29B:
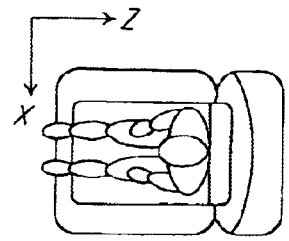
Figure 29C:
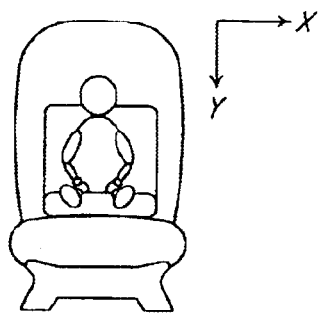
Figure 30A:
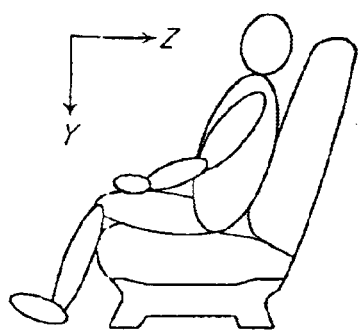
FIGS. 30a, 30b and 30c illustrate projections of an occupant, on the YZ, XZ and XY planes respectively.
Figure 30B:
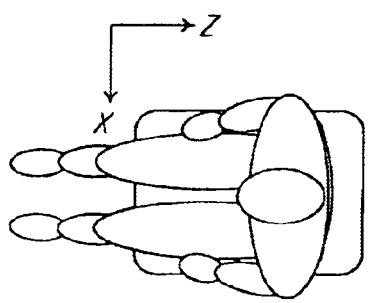
Figure 30C:
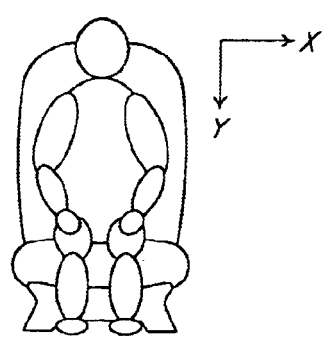
Figure 31A:
FIGS. 31a, 31b and 31c illustrate projections of an occupant, reading a newspaper, on the YZ, XZ and XY planes respectively.
Figure 31B:
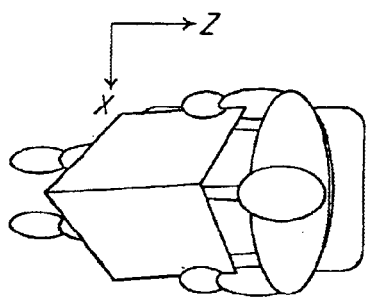
Figure 31C:
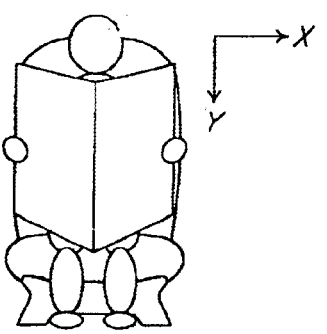
Figure 32:
FIG. 32 illustrates an at-risk zone within which an occupant would be out-of-position (OOP) and at risk of injury by the actuation of an associated air bag inflator module.
Figure 33:
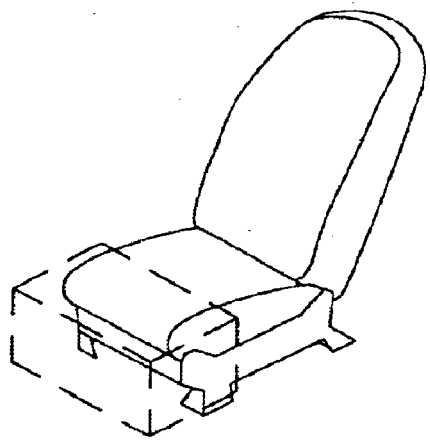
FIG. 33 illustrates a leg occupancy region in front of a seat cushion.

This feature is relatively strong for the projection on the YZ plane since the RFIS would be tilted leftwards, as illustrated in FIG. 27*a*, thus having a small orientation angle versus that of a normally seated occupant, illustrated in FIG. 30*a*, or a FFIS, illustrated in FIG. 29*a*.

Figure 35A:
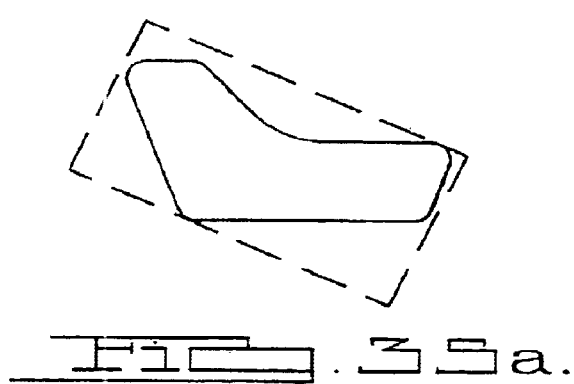
FIGS. 35a and 35b illustrate a bounding rectangle for a RFIS and a normally seated occupant, respectively.
Figure 35B:
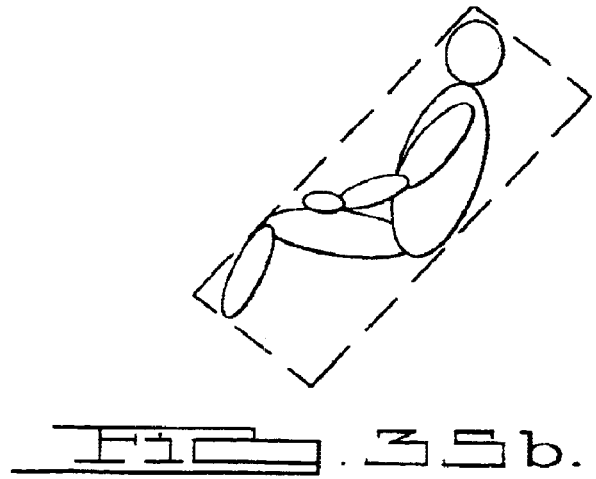

(9) Area of the Bounding Rectangle: Referring to FIG. 35, this is the smallest rectangle enclosing the projection after it is rotated about its orientation angle, and is given by:

$$A_b = L_b \cdot W_b \quad (56)$$

where, first the projection is rotated by θ (the orientation):

$$\alpha = x \cdot \cos\theta + y \cdot \sin\theta \quad (57)$$

$$\beta = -x \cdot \sin\theta + y \cdot \cos\theta \quad (58)$$

and then the length ($L_b$) and width ($W_b$) of the rectangle are determined from:

$$L_b = (\alpha_{max} - \alpha_{min}) \quad (59)$$

$$W_b = (\beta_{max} - \beta_{min}) \quad (60)$$

This measure is typically different for different images.

Figure 36A:
FIGS. 36a and 36b illustrate a best fit ellipse for a RFIS and a normally seated occupant, respectively.
Figure 36B:
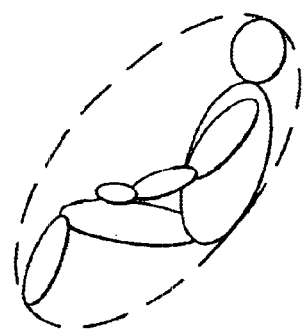

(10) Best Fit Ellipse: Referring to FIG. 36, the best fit ellipse is given by $(x/a)^2 + (y/b)^2 = 1$, where the associated features are given by:

$$\text{Semi major axis} = a = \left(\frac{4}{\pi}\right)^{1/4} \left[\frac{I_{max}^3}{I_{min}}\right]^{1/8} \quad (61)$$

$$\text{Semi minor axis} = b = \left(\frac{4}{\pi}\right)^{1/4} \left[\frac{I_{min}^3}{I_{max}}\right]^{1/8} \quad (62)$$

where, $$I_{max} = \text{Greatest moment of inertia} \quad (63)$$
$$= \sum\sum_{\mathcal{R}} [(y - \bar{y})\sin\theta + (x - \bar{x})\cos\theta]^2$$

$$I_{min} = \text{Least moment of inertia} \quad (64)$$
$$= \sum\sum_{\mathcal{R}} [(y - \bar{y})\cos\theta - (x - \bar{x})\sin\theta]^2$$

R is the region consisting of the projection.

The following are also features obtained from the best fit ellipse:

$$\text{Area of the ellipse} = A_{ellipse} = \pi \cdot a \cdot b \quad (65)$$

$$\text{Volume rendered by the ellipse} = V_{ellipse} = \pi \frac{4a^2 b}{3} \quad (66)$$

$$\text{Eccentricity of the ellipse} = E_{ellipse} = \sqrt{1 - \left(\frac{b}{a}\right)^2} \quad (67)$$

$$\text{Eccentric center of the ellipse} = C_{ellipse} = a \cdot e \quad (68)$$

$$\text{Eccentric normal} = N_{ellipse} = 2b^2/a \quad (69)$$

Occupants are more 'elongated' than child seats especially when viewed from the driver side. Accordingly, the ellipse bounding them would typically be substantially different from an ellipse bounding a child seat. Stated another way, the features describing the ellipse for an occupant are typically different from those for child seats and empty seats.

(11) Eccentricity of the ROI Projection: This is a measure of the elongation, and is given by:

$$e_{proj} = \frac{(\mu_{20} - \mu_{02})^2 + 4\mu_{11}}{A_{blob}} \quad (70)$$

Occupants typically have a larger eccentricity than those of child seats and empty seats because occupants are typically more elongated.

(12) Ratio of Areas: This measure is given by the ratio of the area of the blob to the area of the bounding rectangle, as follows:

$$R_a = A/A_b \quad (71)$$

This measure is relatively small for regions with large protruding parts. e.g., occupants with arms extended.

(13) Central Axis Line: The projection is rotated by the orientation angle θ to a 0° orientation angle, after which straight lines are drawn vertically through the projection. A $2^{nd}$ order fit of the mid points of the portions of these lines bounded by the perimeter is rotated back to its original orientation, resulting in:

$$f(x) = a_0 + a_1 \cdot x + a_2 \cdot x^2 \quad (72)$$

Figure 37A:
FIGS. 37a and 37b illustrate a central axis line for a RFIS and a normally seated occupant, respectively.
Figure 37B:
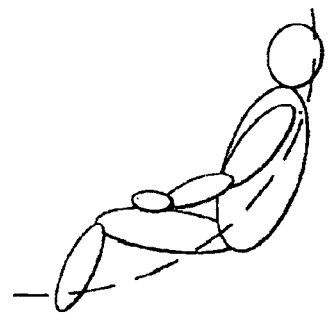

Referring to FIG. 37, the central axis lines for a RFIS and a normally seated occupant typically have different curvatures. Accordingly, the coefficients $a_1$ and $a_2$ are features that indicate the curvature of the central axis line.

After the elements of the test feature vector f are calculated, as given by:

$$f = [f_1\, f_2\, f_3\, \ldots\, f_n]^T \quad (73)$$

the test feature vector is compared with reference (or "golden") feature vectors for the various scenarios $f_s$, where s is the scenario, for example $s \subset \{RFIS, FFIS, Occupant, Empty Seat\}$ $$f_s = [f_{s1}\, f_{s2}\, f_{s3}\, \ldots\, f_{sn}]^T \quad (74)$$

by comparing the vector distance $d_s$ $$d_s = \sqrt{\sum_{i=1}^{n} (f_i - f_{si})^2} \quad (75)$$

The classification is done, for example, using a minimum distance classifier, whereby the detected scene is the one for which the corresponding golden feature vector is nearest ($d_s$ is minimum) to the test feature vector.

OOP Occupant Detection

The distance of the identified scene or portions of the scene from the instrument panel is then identified by looking at the coordinates from a perspective perpendicular to the length of the vehicle. Therefore, it can be determined whether the identified target is within an "at-risk" zone, regardless of shape or size. The lateral position of the occupant/object can also be determined using the 3-D coordinates. Once the image is identified, the position of parts of the image are tracked from frame to frame by assigning a tag thereto, after observing that no change in the initial scene occurs from frame to frame and observing the relative displacements of the individual components. Accordingly, the position of the identified parts of the occupant is found in 3-D space, which aids in identifying an out of position (OOP) occupant, regardless of the size and shape of the "at-risk" zone and regardless of the definition of an OOP occupant (e.g. whether or not hands inside the "at-risk" zone constitutes an OOP occupant), which is useful for situations with dynamic "at-risk" zones.

Determination of the Size of the Occupant and Restraint Control

The 3-D data also provides a rough estimate of the volume, and accordingly the size of the occupant—if present,—which information can be used to control the deployment of the airbag. The decision for the deployment of the airbag or the type of deployment can be determined, for example, as follows: the air bag would be turned off for RFIS or occupants at certain postures deemed at risk from the airbag (out of position (OOP) occupant), the deployment may be softer for a smaller occupant closer to the dashboard.

The occupant sensor 10 can be used on the driver side by imaging the driver, for example from the same headliner location as used to image the passenger, in order to determine the size of the driver, and the position of the torso, head and arms, any of which can be used to track the driver's movement over time, in order to tailor the deployment of the airbag.

The 3-D imaging system 14 acquires range images, which differ from 2-D images in that the pixel values represent distances from the imaging system, as opposed to intensity. By obtaining a range image of x, y, z points, the scene can be viewed from any perspective by translating and/or rotating the coordinate axes. The segmentation process becomes easier and more robust as the background clutter outside the window can be eliminated since their position in 3-D space is known. Similarly the fixed objects (dashboard, door etc) in view can be eliminated since they have fixed coordinates. With 3-D coordinates, the shape descriptors contain more separable information to enhance the classification of the scene—these give an idea of the 3-D volume versus the 2-D shape. Finally, the position of each data point can be clearly determined with respect to any part of the vehicle thus enabling the detection of an out of position (OOP) occupant, which is defined as some part of the occupant within some predefined "at-risk" zone. With a 3-D system, an OOP occupant can be determined for an "at-risk" zone of arbitrary shape or size. Looking at the sequence of range images, arbitrary points can be tracked over time thus enabling the tracking of the occupant during pre-crash or even crash periods. Using 3-D coordinates the approximate volume and hence the size of the target can be determined.

The above-described 3-D imaging system 14 incorporates an image processor and associated electronics for acquiring and processing the associated imaging data. The safety restraint system is controlled responsive to the above-described processing of the imaging data, either by the image processor, or by a separate control processor. Generally, the safety restraint system is actuated responsive to a crash as detected by a crash sensor, provided that the actuation thereof is enabled responsive to the above-described image processing by the image processor.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A method of sensing an occupant in a vehicle, comprising:
    a. providing for acquiring a first three-dimensional image of a scene from a first viewing perspective;
    b. providing for segmenting said first three-dimensional image so as to identify a region-of-interest in said first three-dimensional image;
    c. providing for forming a second three-dimensional image by removing a portion of said first three-dimensional image that is outside of said region-of-interest; and
    d. providing for classifying a scenario responsive to an image content of said second three-dimensional image, wherein said image content is represented by a plurality of three-dimensional features selected from a volumetric central moment, a centroid, a volume, a volumetric roundness, a ratio of radii, a volume of a bounding cube, a ratio of volumes and a percentage of volume occupied.

2. A method of sensing an occupant in a vehicle as recited in claim 1, wherein said portion of said first three-dimensional image that is outside of said region-of-interest comprises a portion of an image of an object selected from a dashboard of the vehicle, an interior of a side door of a vehicle, a scene outside a window of the vehicle, a floor of the vehicle, and a structural pillar in the vehicle.

3. A method of sensing an occupant in a vehicle as recited in claim 1, wherein said operation of classifying comprises detecting the presence of an occupant from a plurality of said features of said second three-dimensional image.

4. A method of sensing an occupant in a vehicle as recited in claim 3, further comprising providing for tracking said occupant from one image frame to another.

5. A method of sensing an occupant in a vehicle as recited in claim 3, further comprising providing for detecting whether said occupant is located in an at-risk zone proximate to a safety restraint system.

6. A method of sensing an occupant in a vehicle as recited in claim 3, further comprising providing for determining a size of said occupant from at least one feature of said second three-dimensional image.

7. A method of sensing an occupant in a vehicle as recited in claim 1, further comprising providing for controlling a safety restraint system responsive to said operation of classifying a scenario.

8. A method of sensing an occupant in a vehicle, comprising:
    a. providing for acquiring a first three-dimensional image of a scene from a first viewing perspective;
    b. providing for transforming said first three-dimensional image to a second three-dimensional image from a second viewing perspective;
    c. providing for segmenting either said first three-dimensional image prior to said transforming operation, or said second three-dimensional image, so as to identify a region-of-interest in said first or said second three-dimensional image;
    d. providing for forming a third three-dimensional image by removing a portion of said first or said second three-dimensional image that is outside of said region-of-interest; and
    e. providing for classifying a scenario responsive to an image content of said third three-dimensional image, wherein said image content comprises a two-dimensional representation of said third three-dimensional image.

9. A method of sensing an occupant in a vehicle as recited in claim 8, wherein said portion of said first or said second three-dimensional image that is outside of said region-of-interest comprises a portion of an image of an object selected from a dashboard of the vehicle, an interior of a side door of a vehicle, a scene outside a window of the vehicle, a floor of the vehicle, and a structural pillar in the vehicle.

10. A method of sensing an occupant in a vehicle as recited in claim 8, wherein said image content is represented by at least one two-dimensional feature selected from a central moment, a normalized central moment, an invariant moment, a perimeter, and area, a roundness, a bending energy, an orientation, an area of a bounding rectangle, a best fit ellipses, and eccentricity of a region of interest, a ratio of areas, and a central axis line.

11. A method of sensing an occupant in a vehicle as recited in claim 10, wherein said operation of classifying comprises detecting the presence of an occupant from a plurality of said features of said third three-dimensional image.

12. A method of sensing an occupant in a vehicle as recited in claim 11, further comprising providing for tracking said occupant from one image frame to another.

13. A method of sensing an occupant in a vehicle as recited in claim 11, further comprising providing for detecting whether said occupant is located in an at-risk zone proximate to a safety restraint system.

14. A method of sensing an occupant in a vehicle as recited in claim 11, further comprising providing for determining a size of said occupant from at least one feature of said third three-dimensional image.

15. A method of sensing an occupant in a vehicle as recited in claim 8, further comprising providing for controlling a safety restraint system responsive to said operation of classifying a scenario.

* * * * *

UNITED STATES PATENT AND TRADEMARK OFFICE
CERTIFICATE OF CORRECTION

PATENT NO. : 6,961,443 B2
DATED : November 1, 2005
INVENTOR(S) : Naveed Mahbub

It is certified that error appears in the above-identified patent and that said Letters Patent is hereby corrected as shown below:

Column 7,
Line 36, delete "$d_{\alpha,z} \cdot x + e_{\alpha,z} \cdot y + f_{60} \cdot z = m_{\alpha,z}$" and insert -- $d_{\alpha,z} \cdot x + e_{\alpha,z} \cdot y + f_{\alpha,z} \cdot z = m_{\alpha,z}$ --.

Column 11,
Line 36, delete "$\phi_6 = (\eta_{20} - \eta_{02})[(\eta_{30} + \eta_{12})^2 - (\eta_{21} + \eta_{03})^2] + 4\eta_{11}(\eta_{30} + \eta_{12})\eta_{21} + \eta_{03}$" and insert -- $\phi_6 = (\eta_{20} - \eta_{02})[(\eta_{30} + \eta_{12})^2 - (\eta_{21} + \eta_{03})^2] + 4\eta_{11}(\eta_{30} + \eta_{12})(\eta_{21} + \eta_{03})$ -- after "$(3\eta_{21} - \eta_{03})(\eta_{21} + \eta_{03})[3(\eta_{30} + \eta_{12})^2 - (\eta_{21} + \eta_{03})^2]$" (47)".

Column 12,
Line 10, insert -- where -- before "$k(t) = \sqrt{\left(\frac{d^2x}{dt^2}\right)^2 + \left(\frac{d^2y}{dt^2}\right)^2}$ (54)".

Column 14,
Line 19, begin new paragraph at "Once the image....".

Signed and Sealed this

Seventh Day of February, 2006

JON W. DUDAS
*Director of the United States Patent and Trademark Office*